(12) United States Patent
Hernandez Hernandez

(10) Patent No.: US 12,036,759 B2
(45) Date of Patent: Jul. 16, 2024

(54) MOULD, MACHINE AND METHOD FOR MANUFACTURING THREE-DIMENSIONAL ITEMS AND MANUFACTURING PLANT ASSOCIATED WITH SAME

(71) Applicant: SIMPLICITY WORKS EUROPE, S.L., Elche (ES)

(72) Inventor: Adrian Hernandez Hernandez, Monforte del Cid (ES)

(73) Assignee: SIMPLICITY WORKS EUROPE, S.L., Elche (ES)

( * ) Notice: Subject to any disclaimer, the term of this patent is extended or adjusted under 35 U.S.C. 154(b) by 297 days.

(21) Appl. No.: 17/278,945

(22) PCT Filed: Sep. 27, 2019

(86) PCT No.: PCT/ES2019/070648
§ 371 (c)(1),
(2) Date: Mar. 23, 2021

(87) PCT Pub. No.: WO2020/065118
PCT Pub. Date: Apr. 2, 2020

(65) Prior Publication Data
US 2022/0032567 A1    Feb. 3, 2022

(30) Foreign Application Priority Data

Sep. 27, 2018  (ES) .................................. 201830936
Sep. 27, 2018  (ES) .................................. 201830937

(51) Int. Cl.
*B29D 35/00* (2010.01)
*A43B 9/18* (2006.01)
(Continued)

(52) U.S. Cl.
CPC ............ *B29D 35/0045* (2013.01); *A43B 9/18* (2013.01); *A43B 13/12* (2013.01);
(Continued)

(58) Field of Classification Search
CPC .................... B29C 45/2606; B29C 2045/2604
See application file for complete search history.

(56) References Cited

U.S. PATENT DOCUMENTS 2,718,031 A * 9/1955 Harvey ............... B29C 45/2602
425/153
3,572,424 A * 3/1971 Byrne ................. B29C 45/4005
425/441

(Continued)

FOREIGN PATENT DOCUMENTS

DE    1946028 A1    3/1971
EP    0907481 B1    4/1999

(Continued)

OTHER PUBLICATIONS

International Search Report and Written Opinion for PCT/ES2019/070648 dated Jul. 10, 2020; 39 pages in English.

*Primary Examiner* — Benjamin A Schiffman
(74) *Attorney, Agent, or Firm* — LUCAS & MERCANTI, LLP

(57) ABSTRACT

A mould for manufacturing three-dimensional items, comprising a body; a lid configured to close the body; and incorporated closing and openings configured to keep the body and the lid joined during the movement thereof is disclosed. A machine for manufacturing three-dimensional items, comprising a receiving module configured to receive the mould; a conditioning module configured to receive the mould from the receiving module and act on the incorporated closing and openings in order to separate the lid from the body; and a handling module configured to receive the body from the conditioning module and enable the placement of the components of the item to be manufactured. A method for manufacturing three-dimensional items and manufacturing plant associated with the machine.

21 Claims, 28 Drawing Sheets

(51) Int. Cl.
  *A43B 13/12* (2006.01)
  *A43B 23/02* (2006.01)
  *B29C 31/00* (2006.01)
  *B29C 45/04* (2006.01)
  *B29C 45/14* (2006.01)
  *B29C 45/16* (2006.01)
  *B29C 45/17* (2006.01)
  *B29C 45/26* (2006.01)
  *B29C 45/33* (2006.01)
  *B29C 45/36* (2006.01)
  *B29C 45/42* (2006.01)
  *B29C 45/66* (2006.01)
  *B29D 35/06* (2010.01)
  *B29D 35/08* (2010.01)
  *B29D 35/10* (2010.01)
  *B29D 35/12* (2010.01)
  *B29D 35/14* (2010.01)
  *B29L 31/50* (2006.01)

(52) U.S. Cl.
  CPC ...... *A43B 23/0215* (2013.01); *A43B 23/0255* (2013.01); *B29C 31/006* (2013.01); *B29C 45/0433* (2013.01); *B29C 45/14008* (2013.01); *B29C 45/14065* (2013.01); *B29C 45/14467* (2013.01); *B29C 45/1671* (2013.01); *B29C 45/1675* (2013.01); *B29C 45/1761* (2013.01); *B29C 45/2602* (2013.01); *B29C 45/2606* (2013.01); *B29C 45/2608* (2013.01); *B29C 45/2673* (2013.01); *B29C 45/33* (2013.01); *B29C 45/36* (2013.01); *B29C 45/42* (2013.01); *B29C 45/66* (2013.01); *B29D 35/0018* (2013.01); *B29D 35/0027* (2013.01); *B29D 35/061* (2013.01); *B29D 35/081* (2013.01); *B29D 35/084* (2013.01); *B29D 35/10* (2013.01); *B29D 35/122* (2013.01); *B29D 35/142* (2013.01); *B29D 35/148* (2013.01); *A43D 2200/10* (2013.01); *B29C 2045/14155* (2013.01); *B29C 2045/1796* (2013.01); *B29C 2045/2604* (2013.01); *B29K 2995/0046* (2013.01); *B29K 2995/0067* (2013.01); *B29L 2031/504* (2013.01)

(56) References Cited

U.S. PATENT DOCUMENTS

| | | | | |
|---|---|---|---|---|
| 3,706,116 | A | * | 12/1972 | Drazick ............... B29C 45/2602 425/451.9 |
| 3,724,802 | A | * | 4/1973 | Veneria ............... B29C 45/2602 249/67 |
| 5,494,435 | A | * | 2/1996 | Vandenberg ........ B29C 45/2602 425/589 |
| 6,168,741 | B1 | * | 1/2001 | Foldes ................. A43B 1/0027 425/577 |
| 6,461,558 | B1 | * | 10/2002 | Berghoff ............... B29C 31/006 264/272.17 |
| 7,192,543 | B2 | * | 3/2007 | Malfliet ................ B29C 44/1233 264/318 |
| 7,614,873 | B1 | * | 11/2009 | Morey ................. B29C 45/2602 425/451.9 |
| 10,857,712 | B2 | * | 12/2020 | Buzzo Titella ......... B29C 45/32 |
| 11,440,279 | B2 | * | 9/2022 | Hernandez Hernandez ................ B29C 45/14344 |
| 11,738,489 | B2 | * | 8/2023 | Bokich ................... B29C 33/20 425/595 |
| 2016/0257084 | A1 | | 9/2016 | Chen |
| 2017/0144350 | A1 | | 5/2017 | Buzzo Titella |
| 2017/0239903 | A1 | | 8/2017 | Gilgore |
| 2018/0326633 | A1 | * | 11/2018 | Hernandez Hernandez ................ B29C 45/14 |

FOREIGN PATENT DOCUMENTS

| | | |
|---|---|---|
| EP | 1190828 A1 | 3/2002 |
| EP | 3378620 A1 | 9/2018 |
| GB | 654479 A | 6/1951 |
| JP | S6342828 A | 2/1988 |
| TW | 200914246 A | 4/2009 |
| WO | 9739870 A1 | 10/1997 |
| WO | 97/46371 A1 | 12/1997 |
| WO | 2011076756 A1 | 6/2011 |
| WO | 2013054255 A1 | 4/2013 |
| WO | 2015032908 A1 | 3/2015 |
| WO | 2018109242 A1 | 6/2018 |

* cited by examiner

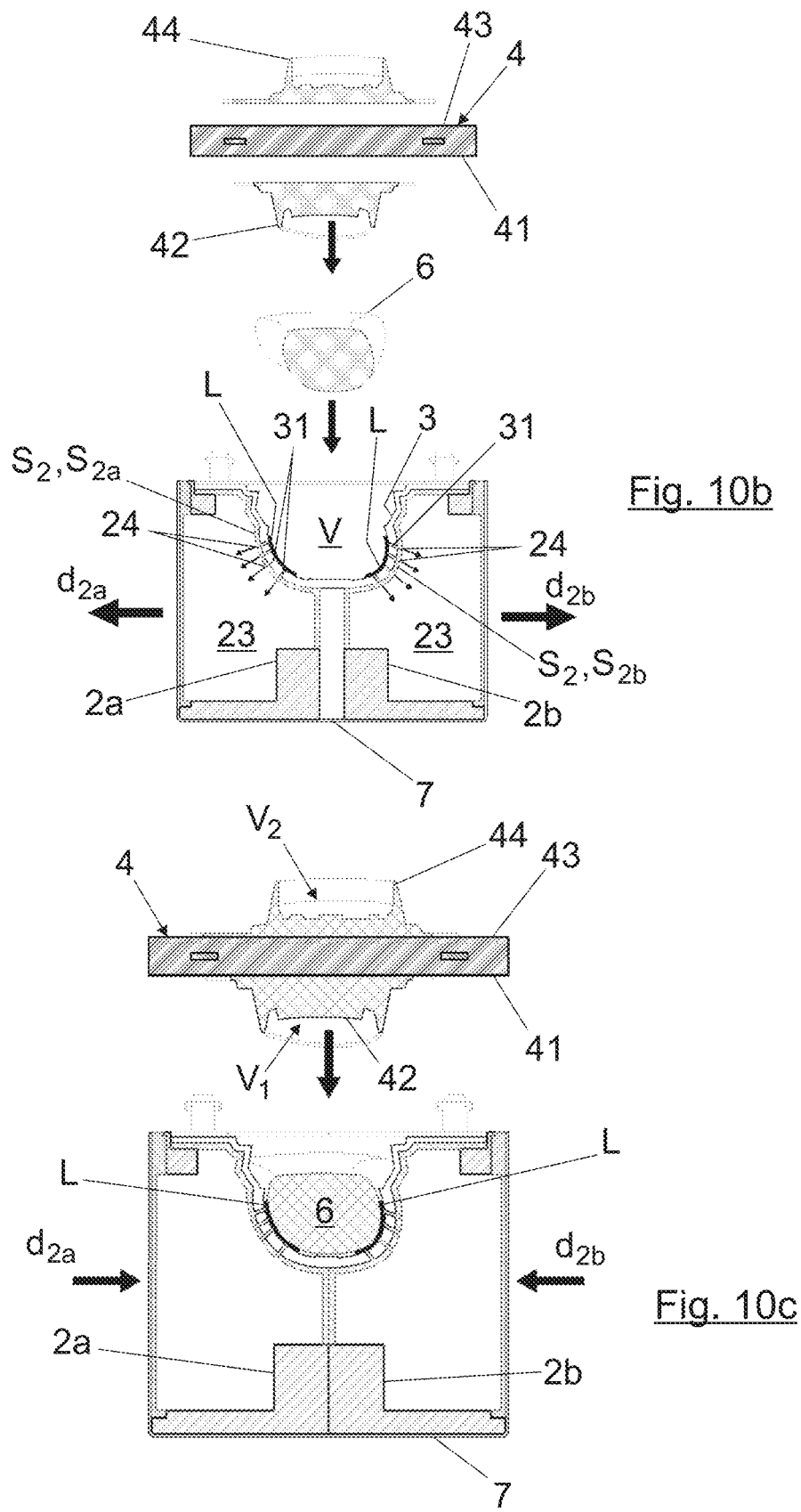

MOULD, MACHINE AND METHOD FOR MANUFACTURING THREE-DIMENSIONAL ITEMS AND MANUFACTURING PLANT ASSOCIATED WITH SAME

CROSS REFERENCE TO RELATED APPLICATION

This Application is a 371 of PCT/ES2019/070648 filed on Sep. 27, 2019, which claims priority of Spanish Patent Application No. P201830936 filed Sep. 27, 2018 and Spanish Patent Application No. P201830937 filed Sep. 27, 2018, all of which are incorporated herein by reference.

FIELD OF THE INVENTION

The present invention relates to a mould for manufacturing three-dimensional items, especially ones with flexible walls, such as footwear, bags, clothing, etc., and in general all kinds of items which are limited by a flexible external wall based on laminar parts, of a flexible nature, which are joined together by the opposite edges thereof. It is also for manufacturing items with flexible walls equipped with an internal lining, or comprising a wall or core which is semi-rigid, such as seat furniture, vehicle dashboards, etc.

The present invention also relates to a machine for manufacturing three-dimensional items in general, being especially applicable to the manufacture of three-dimensional items of the type described above, which are assembled and manufactured by means of the use of independent moulds which are kept closed without needing to be connected to a machine, in order to facilitate the mobility thereof along the process chain of a manufacturing plant. The present invention also relates to a process for manufacturing three-dimensional items in general, as well as a manufacturing plant associated with said machine.

The present invention enables the implementation, both in large-scale and small-scale productions, of the new 3D Bonding and 3D Printing technologies, among others included in Industry 4.0, in order to manufacture in a flexible and smart manner, with reduced costs and being closer to the consumer.

BACKGROUND OF THE INVENTION

Traditionally, items of the type indicated have been manufactured by means of joining by sewing without injecting the laminar parts making them up. The seams thereof require the creation of holes which, in turn, form penetration pathways for water which require the use of liners based on special membranes, internal sealing tapes, etc. for manufacturing waterproof products. In the particular case of footwear, once the laminar parts are sewn, it is also necessary to perform a subsequent process of gluing the sole onto said laminar parts. In this particular process, the parts are sewn before the sole is placed. All of this implies a high amount of labour and a long process time, as well as an increase in production costs. Furthermore, it also implies limitations in the design and comfort of said items, as well as a loss of stability thereof.

Traditional factories usually require:
separating complex processes into a large number of basic tasks, sequenced in series within the production chain;
an availability of machines of varying complexity in order to support operators in the execution of the different process steps; and
a specific distribution of the work stations for the execution of the manufacturing tasks, according to the main phases of the manufacturing processes and the systems used to transport raw materials, components, finished or semi-finished products, from one place to another in the factory.

In summary, all this implies:
the general presence of many workers in the different process areas;
the supervision and manual control of a large number of operations;
the use of a large number of classic mechanical conveyor belts, with high rigidity and little to no flexibility to adapt to changes and/or new methods; and
classic compartmentalised organisation, made up of units and storage areas, wherein the process units are fed by the stock of materials stored in inbound storage areas, and from which they are subsequently sent as semi-finished products to the outbound storage areas.

Moreover, currently, processes are known which are called "direct injection onto upper", wherein once the parts have been sewn, a component of the item is formed thereon by means of injection. In the particular case of footwear, it consists of manufacturing an upper with seams and closing it on the bottom with fabric, according to a sewing technique called "strobel", which configures a sock. Said sock, once sewn, fits into a last which is connected to an injection unit that, in turn, has two lateral half-sole moulds which close by hugging the last with the sock. This produces a closure which enables the polymer to be kept injected or cast in the volume constituting the sole.

Direct injection onto upper processes are very useful because they reduce the cost of labour in the processes for assembling and gluing the sole. However, they do not alter the traditional sewing process which, in terms of labour, represents more than 50% of the total cost of the product. Therefore, although they entail savings, they do not compensate for the manufacturing cost of injection moulds. Additionally, direct injection moulds have the following problems.

First, direct injection moulds are generally made up of several machined metal parts. In the case of footwear, in order to make one model, several sizes of moulds are necessary, with the corresponding right and left feet thereof, for which reason the cost of manufacturing a series of moulds is very expensive. This has made it so that although it is beneficial, direct injection can only be used for production batches which are much higher than average, which has been a significant barrier to this technology for decades. This is added to the fact that fashion changes at an increasingly fast pace, making short production batches more necessary, thus creating a greater lack of competitiveness of the system. In conclusion, if the moulds were substantially cheaper, direct injection would expand rapidly in the market and to other similar processes.

In the specific case of direct injection moulds for two injections of two polymers with different features, they are made up of the following parts:
Aluminium last wherein the upper is mounted and is screwed to the machine, and which, furthermore, is usually rotated in order to place a second last.
Aluminium last with first skid in contact with the ground, or drummy plate, which is also screwed to the machine.
Two internal and external lateral moulds which follow the sole on the sides and close with the upper, or side rings.

Piston mould which rises and lowers in order to enable the entry and closure of the polymer and the injection point. In turn, it also has the drawing of the tread, or bottom mould.

Since both lasts are secured to the machine, and the side rings are also independently secured to the machine, it is very difficult to obtain exact precision in the centring thereof with respect to the lower portion of the mould. To do so, it is necessary to invest a lot of time in calibration between the lasts and the rest of the components of the mould.

The fact of having to secure several left and right moulds in different sizes implies the use of large carousel-type machinery which generally hold between 24 and 36 stations. This machinery is expensive, occupies a large amount of space, is heavy and consumes a lot of electrical energy. These aspects further limit the use of this technology.

Direct injection moulds generally close against the upper with the aluminium surface and, in other cases, by means of a dressing made of a softer material, such as Teflon, which is manually inserted into the slot. This attempts to compensate for irregularities due to the overlapping parts of the upper which are the cause of polyurethane flowing towards the outside of the sole, between the leather and the mould. However, said deformation is not enough to compensate for these irregularities and there are usually leaks.

On the other hand, direct injection soles have a parting line on the front and back portions of the footwear, as a result of the joining between the side rings. This detail significantly decreases the aesthetic quality compared to other processes such as assembling and gluing wherein the soles do not have said parting line. This occurs due to the fact that the moulds for configuring the midsole close with two half sections which, although the mould is fitted well, also always leave a visible closure line in the midsole of the shoe.

During the production process, demoulding agents are used which are sprayed against the aluminium mould in order to prevent the polyurethane from adhering to the surface of the mould. There are several problems in this case. On one hand, they are not environmentally-friendly, and on the other hand, these demoulding agents create a surface layer on the mould which acts on the chemical reaction preventing the sticking thereof, but at the same time destroying the surface skin created by the polyurethane reaction which is usually smooth and free of bubbles. On the contrary, the agents destroy that smooth layer, and the bubbles resulting from the expansion reaction of light polyurethanes end up being visible on the outside, thus generating an appearance with low surface quality.

Mainly, the costs of direct injection moulds are high because they consist of several aluminium parts generally machined by numerical control. These moulds are designed to trap the upper on the last, by means of an aluminium part which configures the external face of the sole and another aluminium part which configures the internal face of the sole of the footwear. Furthermore, they have a part secured to a piston by the lower portion which has the design of the tread and two lasts (a metal one with the reverse tread design used to configure the injection of a thin skid, and the other last which is what enables it to envelop the footwear).

Another drawback from the point of view of the design is that with the aluminium moulds, the soles are usually designed considering the inner projections of the part according to the opening directions of the moulds and considering the capacity for deformation of the injected material to be able to bend and exit. This represents a problem as a design limitation since it is considered to depend only on the deformation of the sole when exiting and not on the deformation of the mould since it is made of aluminium.

Another drawback from the aesthetic point of view is that with direct injection moulds, the pressure exerted on the upper material by the aluminium mould usually marks the upper materials such as leather, due to the high pressure and hardness of the mould. This pressure in turn is usually several tonnes in order to be able to compress overlapping leathers and prevent the overflow of injected material which leaks between the surface of the upper and the mould.

Finally, these direct injection systems are rotating, with a "banana" or "carousel"-style, in order to place several sizes of footwear, so that while some are prepared, other types of footwear spend the necessary time inside the mould for curing the polymer.

Moreover, other significant disadvantages of this type of mould, related to the permanent joining thereof to the injection machines, are summarised below:

The assembly and/or screwing of the different mould components in the machine implies a considerable working time, which is repeated every time a different model and/or item has to be manufactured. Furthermore, they require a connection to other external feed elements (wiring, air suction ducts, etc.) and/or operation elements (heaters, mechanical components of the machine, etc.).

Half-manufactured items must remain in the mould until they are ready to move on to a subsequent step of the manufacturing process (for example, a second step, injection, demoulding, etc.). In turn, given that the mould is linked to the machine and permanently joined to it until it is changed, said machine is unusable until the necessary conditions are met (for example; once the necessary curing time of the half-manufactured item has passed).

Most of the parts that make up these moulds are designed for specific models and/or sizes which are incompatible with other models and/or sizes.

The pressures exerted between the mould and the countermould (last) during the injection are considerable.

There is limited control over the state of the items in progress and/or the physical conditions produced within the mould at any time, as well as a low traceability of the components of the mould.

The present invention solves the problems described above by means of an independent mould that is kept closed without needing to be connected to a machine, the configuration of which enables the mobility thereof along the process chain of a manufacturing plant (for example; from the storage thereof until the demoulding of the item manufactured therein and subsequent reuse of the mould). Enabling the position of the mould, as well as the state of the item contained therein and the information related to it, to be known at any time of the process, locally and/or remotely. And it uses these smart systems to incorporate the mould into the process line and automatically lead it to the various workstations. Wherein said mould has a greater number of standard and interchangeable components which are easy to manufacture and have low costs, being compatible with different models and/or sizes of the items to be manufactured, and furthermore they enable it to work at lower pressures and increase the efficiency thereof. Wherein said mould is not permanently joined to a certain machine in the process chain, but can be freely moved along said process chain in order to work in other machines configured to perform different processes, and/or be led to the storage area with a half-manufactured product therein until the necessary conditions are met therein in order to move on to a subsequent step of the manufacturing process.

Likewise, it should be noted that the mould of the present invention is applicable both in the direct injection to the upper processes described above, as well as in the manufacturing of three-dimensional items with flexible walls by means of the method described in WO2018109242A1. In said procedure, the three-dimensional items with flexible walls are manufactured by means of a mould and a countermould between which a space matching that of the item to be obtained is defined. The item is usually made up of one or more flexible laminar parts which are mounted on a flexible template that has multiple functionalities and is arranged on the internal surface of the mould, joining the laminar parts to each other by means of an adherent material which is injected in a molten state through a network of conduits defined between the mould, the flexible template and opposing edges of laminar parts.

However, it is currently unknown if there are machines which enable working with this type of independent mould, as well as methods for manufacturing three-dimensional items using them and manufacturing plants associated with them.

The present invention solves the problems described above by means of a machine for manufacturing three-dimensional items in general, especially designed to work with this type of independent mould, in order to take full advantage of the benefits offered by them. The present invention also relates to a process for manufacturing three-dimensional items in general which uses said moulds in an efficient manner, as well as to a smart manufacturing plant associated with said machine.

The present invention enables the creation of new smart factories which, unlike traditional ones, have the following advantages:
- they are able to make very short production runs (for example, one single pair of shoes) according to the requirements of a particular customer;
- they are able to make decisions by artificial intelligence, having several decision-making points, both at the beginning of the input line, and at the output of moulds to the storage area;
- they have the ability to be remotely connected to the moulds in order to know the status thereof;
- they are able to use augmented reality to see in situ and in a virtual manner what happens in production;
- they have collaborative robots to assist with repetitive tasks, such as placing parts in the mould; and
- they have transport robots which send process parts prior to the mould injection section.

DESCRIPTION OF THE INVENTION

The mould for manufacturing three-dimensional items of the present invention comprises:
- a body which defines an internal surface, which may be made up of one or more parts;
- a lid configured to close said body; and
- incorporated closing and opening means configured to keep the body and the lid joined during the movement of said mould.

This configuration enables the mould to be kept closed without needing to be connected or fastened to a machine. This gives it the advantage of being able to move to any other point of the manufacturing plant or process line, for example, the injection area, mould storage areas, work stations for placing the laminar parts, demoulding areas, etc. It has the additional advantage that the mould, apart from being empty, can be moved from one area to another with the half-manufactured item therein. This enables the machines of the process chain to be left free so that they can be used by other moulds, while the half-manufactured items finish meeting the necessary conditions (curing time, resistance, pressure, temperature, etc.) within the very mould, and any other place in the factory, in order to move on to the subsequent steps of the manufacturing method.

Preferably, the mould comprises an elastically deformable template arranged between the body and the lid, for example, made of silicone, which is fitted on said internal surface and which is configured to receive one or more laminar parts of an item to be manufactured. Since silicone is a chemically-resistant material, it makes it possible to forego demoulding agents during the production process.

Preferably, the mould comprises a countermould, or last in the case of footwear, which occupies a defined volume between the body and the lid, and more preferably, between the template and the lid, which is configured to press the laminar parts against the template when the body and the lid are joined. This enables the last, once the molten plastic which joins the opposing edges of laminar parts has been injected, or prior to the injection process in the case of laminar parts which are sewn, to maintain the necessary pressure on said laminar parts during the curing time, or at any other time, in order to ensure that the parts do not separate. Thus, the mould can move to other areas of the production line while the curing is being performed therein, the body and the lid being joined together and pressing on the last which is fitted between both of them.

Another notable advantage of having the last arranged inside the mould is that it is perfectly centred, unlike the injection moulds known in the state of the art, wherein centring problems usually occur due to the mould parts and the lasts being joined to the machine, as described in the background section.

Preferably, the body comprises a demoulding hole configured to enable the passage of an external pushing or demoulding element for extracting the last by pushing on it with said external demoulding element. In this manner, once the item has been manufactured, the last can be extracted therefrom.

Preferably, the body comprises:
- a fixed portion whereon the mould is supported, formed by one or more parts; and
- an interchangeable portion wherein the internal surface of the body is defined, and which is configured to be removably mounted on the fixed portion. Wherein the interchangeable portion may be formed by one or more parts, interchangeable in a joined or individual manner.

This enables the components of the mould to be standardised, such that the fixed portion, or chassis, acts as a support element and/or structural element of the mould, regardless of the model and/or the size of the item to be manufactured, for which reason said fixed portion is shared by a large number of items, as well as a large number of models and/or sizes thereof. Moreover, the interchangeable portion is what determines the shape, size and/or features of the design of each item to be manufactured. Therefore, with a smaller number of components and/or parts of the mould, a larger number of different items can be manufactured. Likewise, the fixed portion and the interchangeable portion have complementary shapes which facilitate the assembly and replacement thereof in a quick and easy manner.

According to a particular embodiment, the lid can also comprise one or more interchangeable portions, defining other shapes and/or surfaces of the item to be manufactured, in order to further standardise the components of the mould.

Preferably, the fixed portion is made of metal material, for example aluminium, in order to offer the mould the robustness and resistance necessary to perform the functions described above.

The interchangeable portion can also be metal, although preferably it is made of plastic material, in order to carry out a triple function:

Facilitating the manufacturing of said interchangeable portion with cheaper materials, enabling the quick and cheap manufacturing thereof using 3D printing techniques.

Offering a support base for the laminar parts, such that when they receive the pressure of the last on the elastically deformable template, pressed in turn by the lid when it is closed against the body, said deformity exerts a counter pressure, or in the opposite direction, perpendicular to the flexible parts, ensuring an efficient closure during the passage of the molten plastic material in order to prevent it from overflowing out of the mould.

Using rigid metal materials, such as aluminium, in the fixed portion of the body and in the lid, combined with other materials in the interchangeable portion of the body and/or in the template made of elastically deformable material. Such that, since the support material is softer than aluminium, a more efficient closure is generated which enables the irregularities of the surface of the product or item to be manufactured, or even two superimposed upper parts, to be covered. This type of closure is smoother and does not require such high closure pressures, because instead of deforming the item in order to prevent overflow, what is deformed is a portion of the mould. The closure pressures can go down to a ratio of 10 to 1 compared to those received by non-transportable aluminium moulds which are joined to the existing machines. With this, smaller and cheaper machinery is able to be manufactured for handling this type of mould.

Preferably, the body comprises:

one or more vacuum chambers communicating with a plurality of suction holes that reach the internal surface of the body; and one or more extraction nozzles which enable air to be extracted from the vacuum chamber.

In turn, the template comprises:

a plurality of holes in communication with the suction holes, configured to attract one or more laminar parts of the item to be manufactured against said template when the air is extracted from the vacuum chamber.

This facilitates the job of placing the laminar parts inside the mould, since said parts are kept attracted on the template as the operator places them neatly, without having to adhere them to said template by using adherent products.

This same configuration can also be performed in the countermould, or last in the case of footwear, with the same purpose. Meaning, said countermould or last can also comprise a vacuum chamber in communication with a plurality of suction holes that reach the surface of one or more of the faces thereof. Such that, when placing the laminar parts on said faces, the parts are kept attracted against them due to the extraction of air from the vacuum chamber, during the process of placing the parts. For this reason, it is not necessary to adhere them to the countermould or last by using adherent products, nor is it necessary to cover the last with a sewn sock as is traditionally done in direct injection processes.

Preferably, the body comprises:

a first lateral part which defines a first portion of the internal surface whereon the template is fitted; and a second lateral part which defines a second portion of the internal surface whereon the template is fitted;

wherein the first lateral part and the second lateral part are joined together when the lid is joined to the body, and configured to move in opposite directions once the lid is removed from the body. The first lateral part and the second lateral part can also stay joined without the lid needing to be placed. Likewise, the elastically deformable template is positioned on the lateral parts, so that in order to separate them, it is necessary to overcome the elongation resistance of said template.

This enables the mould to be opened laterally, once the lateral parts are arranged on the template, in order to in turn enable the last to be introduced. Moreover, in order to prevent the loss of the vacuum inside the mould in said situation, which could cause the lateral parts to be displaced, preferably, the first lateral part and the second lateral part are jointly covered by an elastic cover configured to prevent the entry of external air when both lateral parts are separated. More specifically, the elastically deformable template fitted on the internal surface portions of the body, in combination with the elastic cover, which is also deformable, enable said body to be kept airtight despite the separation between the first lateral part and the second lateral part.

To increase the sliding and/or mobility of the mould along the process line, said elastic cover may comprise on the external lower face thereof, or support face, one or more metal plates to prevent friction that the plastic material of the cover would cause on other transport elements (conveyor belts, etc.) and/or machinery (work stations, etc.).

To enable the interaction of actuations and/or external elements with the mould, the elastic cover also comprises a plurality of openings or windows with different shapes and sizes to make some functional and/or connecting elements thereof visible, such as for example, the incorporated closing and opening means, the lateral closing and opening means, the air extraction nozzle of the vacuum chamber, electrical connectors, etc.

Preferably, the mould comprises at least one or more electric heaters arranged inside the body. Preferably, said heaters are thermally insulated from the outside of said body by the elastic cover. This enables the heat to be retained inside the mould, such that electric heaters with lower power and electrical consumption can be used. Specifically, the fact that the mould is covered by a material with lower thermal conductivity than aluminium enables the mould to be kept tempered and, thus, reduces energy.

The electric heater can be wired to the production pathway, or electrically powered by the mould itself by means of batteries.

Preferably, the mould comprises lateral closing and opening means configured to keep the first lateral part and the second lateral part joined, and to enable a subsequent lateral separation thereof, formed by:

at least one lateral latch which runs through a lateral hole of the body, at the end of which it has a lateral closing element configured to join the first lateral part to the second lateral part; and at least one lower actuation which runs through a lower hole of the body, at the end of which it has a lateral opening element configured to unlock the closing element of the lateral latch.

The described configuration increases the accessibility of the lateral closing and opening means, such that they can be easily actuated from the outside by actuating on the lateral faces of the mould and on the lower face thereof.

Preferably, the lid comprises:
a first face which defines a first countermould associated with a first volume of the item to be manufactured; and
a second face which defines a second countermould associated with a second volume of the item to be manufactured;
wherein the lid is reversible which enables the body to be closed through the first face or the second face.

In this manner, a reversible lid is obtained which enables a first injection of plastic material by means of the first face, and a second injection of plastic material by means of the second face. Thanks to this, the number of mould components is able to be reduced even further, apart from simplifying the manufacturing method.

Preferably, the lid comprises at least one partial coating or sheet made of an elastically deformable material, for example silicone, arranged in one or both countermoulds of the first and second faces (for example, adhered on one or both countermoulds). The purpose of this coating is to form additional shapes and/or configurations (channels, gaps, contours, etc.) of the product which add to the ones already defined by the machining of the countermoulds (for example, in addition to the shape and/or configuration of the sole of an athletic shoe). In this manner, a continuous design around the product can be achieved, in combination with the elastically deformable silicone template located in the body of the mould. Meaning, a 360° circulation of the polyurethane injected into the mould, taking advantage of the steps and/or channels defined for it in the template and the coating.

Incorporated closing and opening means are understood as all those which are integrated into the mould itself, or make up part of it, and which move together with said mould along the production line in order to keep the lid closed against the body. This is regardless of whether or not said incorporated closing and opening means require other external elements (actuations, mechanisms, tools, etc.) to open and/or close the lid with respect to the body.

Preferably, the incorporated closing and opening means comprise:
at least one upper latch which runs through an upper hole extending from the body to the lid, at the end of which it has an upper closing element configured to join the body to the lid; and
at least one locking element which works in collaboration with the upper closing element; and
at least one unlocking actuation configured to release the closing element from the locking element.

The described configuration increases the accessibility of the incorporated closing and opening means, such that they can be easily actuated from the outside by acting, for example, on the lower face thereof. Furthermore, said configuration ensures a secure and airtight closure of the mould, capable of withstanding the working pressures produced therein, for example, during the injection steps of the manufacturing process, without producing any overflow of the molten material.

According to a particular embodiment, the incorporated closing and opening means can comprise one or more electromagnets arranged in the mould, configured to electromagnetically join the body and the lid.

The mobile and/or transportable nature of the mould of the present invention, which further enables different steps of the manufacturing process to be performed in different work areas and/or machines, makes it convenient to carry out comprehensive control at all times of the position of the mould, of the information of the item contained therein, of certain physical conditions which influence the state of said item during the manufacture thereof, etc. All of this in order to obtain a smart manufacturing method which enables an optimal and efficient management of the available resources (machinery, moulds, materials and/or components of the item to be manufactured, etc.) to be done, in addition to increasing the production capacity of the plant, reducing manufacturing times and simplifying costs.

To do so, preferably, the mould comprises remote identification means configured to transmit information about the mould by means of radio frequency to a data network. In this manner, the central data system of the manufacturing plant can receive said information and send the corresponding orders to the mould for the operation thereof.

Preferably, the mould comprises local identification means configured to transmit information about the mould by means of wiring and/or direct connection to an electronic device.

Preferably, the mould comprises wireless connection means configured to connect to the Internet and/or a data network.

Preferably, the mould comprises one or more pressure and/or temperature sensors in order to know the physical conditions therein.

Preferably, the mould is electrically powered from an incorporated power source by means of one or more batteries arranged therein, and/or from an external power source through an electrical socket arranged therein.

The machine for manufacturing three-dimensional items of the present invention comprises:
a receiving module configured to receive a mould formed by a body and a lid joined by means of incorporated closing and opening means;
a conditioning module configured to receive the mould from the receiving module and act on the incorporated closing and opening means in order to separate the lid from the body; and
a handling module configured to receive the body from the conditioning module and enable the placement of the components of the item to be manufactured.

Incorporated closing and opening means are understood as all those which are integrated into the mould itself, or make up part of it, and which move together with said mould along the production line in order to keep the lid closed against the body. This is regardless of whether or not said incorporated closing and opening means require other external elements (actuations, mechanisms, tools, etc.) to open and/or close the lid with respect to the body.

Preferably, the receiving module comprises:
a first conveyor belt configured to receive the mould; and
a first alignment mechanism configured to align the mould according to an advance direction of the first conveyor belt.

Preferably, the conditioning module comprises:
a second conveyor belt configured to receive the mould from the receiving module; and a second centring mechanism configured to centre the mould horizontally, longitudinally and transversely according to an advance direction of the second conveyor belt.

Preferably, the conditioning module comprises:
a lifting mechanism configured to lift the mould.

Preferably, the conditioning module comprises:
an opening mechanism configured to act on the incorporated closing and opening means of the mould and separate the lid from the body; and
a securing mechanism configured to secure the lid once it is separated from the body.

Preferably, the conditioning module comprises:
a turning mechanism configured to turn over the lid.

Preferably, the conditioning module comprises:
a closing mechanism configured to act on the incorporated closing and opening means of the mould and join the lid to the body after said body passes through the handling module.

Preferably, the handling module comprises:
a lateral opening mechanism configured to act on lateral closing and opening means of said body in order to laterally separate a first lateral part and a second lateral part thereof.

Preferably, the handling module comprises:
a demoulding mechanism configured to enable the extraction of a manufactured item arranged inside the body.

Preferably, the handling module comprises:
a robotic mechanism configured to enable the placement inside the body of the components of the item to be manufactured.

The robotic mechanism can adopt different configurations (one arm, two arms, double arm, computer vision, etc.), depending on the benefits and/or functional nature of the existing robots on the market. To this end, the use of collaborative robots (cobots) is of special interest due to the multiple benefits thereof.

Preferably, the handling module comprises:
a lateral closing mechanism configured to act on the lateral closing and opening means of said body in order to laterally join the first lateral part and the second lateral part thereof.

The described configuration of the lateral opening mechanism and the lateral closing mechanism enables the lower face of the mould and the lateral faces thereof to be acted on, respectively. This enables space to be freed up in the central and upper portion of the handling module, in order to facilitate the job of placing the components of the item to be manufactured for an operator or for the robotic mechanism.

The machine can also comprise a vacuum system for the connection thereof to one or more vacuum chambers arranged in the mould (especially in the body thereof), and/or in the countermould or last. In which said vacuum chambers communicate with a plurality of suction holes, such that, when placing the laminar parts on the surfaces wherein said suction holes are located, the components of the item to be manufactured remain attracted against them due to the extraction of air from the vacuum chambers, during the process of placing said components. For this reason, it is not necessary to adhere them to the body (or the template) or last by using adherent products, nor is it necessary to cover the last with a sewn sock as is traditionally done in direct injection processes.

The method for manufacturing three-dimensional items of the present invention comprises the following steps:
a) receiving a mould formed by a body and a lid joined by means of incorporated closing and opening means;
b) acting on the incorporated closing and opening means in order to separate the lid from the body; and
c) placing the components of the item to be manufactured inside the body.

Preferably, step a) comprises:
a1) receiving the mould on a first conveyor belt; and
a2) aligning the mould according to an advance direction of the first conveyor belt.

Preferably, step b) comprises:
b1) receiving the mould on a second conveyor belt;
b2) centring the mould horizontally, longitudinally and transversely according to an advance direction of the second conveyor belt;
b3) lifting the mould;
b4) acting on the incorporated closing and opening means of the mould in order to separate the lid from the body; and
b5) securing the lid once it is separated from the body.

Preferably, step b) additionally comprises:
b6) turning over the lid.

Preferably, step b) additionally comprises:
b7) acting on the incorporated closing and opening means of the mould in order to join the lid to the body.

Preferably, step c) comprises:
c1) acting on lateral closing and opening means of the body in order to laterally separate a first lateral part and a second lateral part thereof.

Preferably, step c) additionally comprises:
c2) extracting a manufactured item arranged within the body; and/or
c3) placing the components of the item to be manufactured inside the body.

Preferably, step c) additionally comprises:
c4) acting on the lateral closing and opening means of the body in order to laterally join the first lateral part and the second lateral part thereof.

Preferably, the three-dimensional items to be manufactured have flexible walls.

The plant for manufacturing three-dimensional items of the present invention comprises:
a selection area configured to store a plurality of moulds formed by a body and a lid joined by means of incorporated closing and opening means;
an assembly area which has at least one assembly machine configured to:
receive a mould from the selection area;
act on the incorporated closing and opening means in order to separate the lid from the body;
enable the placement of the components of the item to be manufactured inside the body; and
act on the incorporated closing and opening means in order to join the lid to the body after the placement of the components of the item to be manufactured; and
an injection area which has at least one first injection machine configured to:
receive a mould from the assembly area after the placement of the components of the item to be manufactured, the lid of which is joined to the body; and
join the components of the item to be manufactured arranged inside the mould by means of a first injection of plastic material.

Preferably, the assembly area comprises an advancement area which enables the advancement of a selected mould over other waiting moulds in order to lead it to a free assembly machine.

Preferably, the injection area includes:
a turning machine configured to:
receive a mould from the assembly area after the placement of the components of the item to be manufactured, or to receive a mould from the first injection machine after the first injection of plastic material; and
turn over the lid and join it to the body once again; and
a second injection machine configured to:
receive the mould from the turning machine; and
perform a second injection of plastic material.

The mobile and/or transportable nature of the mould further enables different steps of the manufacturing process to be performed in different work areas and/or machines, making it convenient to carry out comprehensive control at all times of the position of the mould, of the information of the item contained therein, of certain physical conditions which influence the state of said item during the manufacture thereof, etc. All of this in order to obtain a smart manufacturing method which enables an optimal and efficient management of the available resources (machinery, moulds, materials and/or components of the item to be manufactured, etc.) to be done, in addition to increasing the production capacity of the plant, reducing manufacturing times and simplifying costs.

BRIEF DESCRIPTION OF THE DRAWINGS

What follows is a very brief description of a series of drawings that aid in better understanding the invention and which are expressly related to one embodiment of said invention that is presented by way of a non-limiting example of the same.

FIGS. 10a-10f: Sequence of operations for manufacturing footwear shown by means of transverse cross sections of the mould.

FIG. 12b: Detail Z of FIG. 12a.

FIG. 13b: Detail W of FIG. 13a.

DETAILED DESCRIPTION OF THE INVENTION

Figure 1:
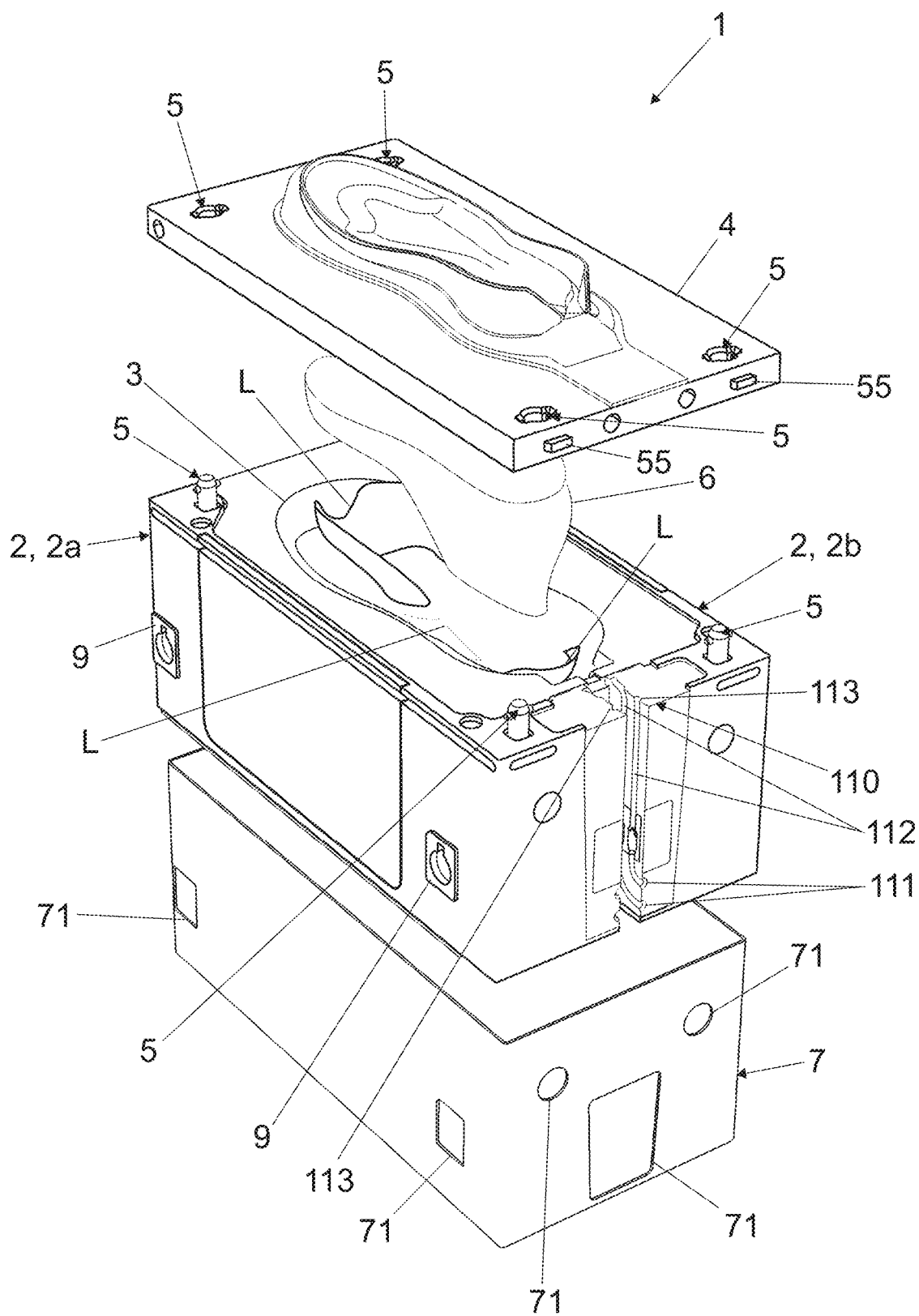
FIG. 1: Perspective view of a first exploded view of the mould of the present invention.
Figure 2:
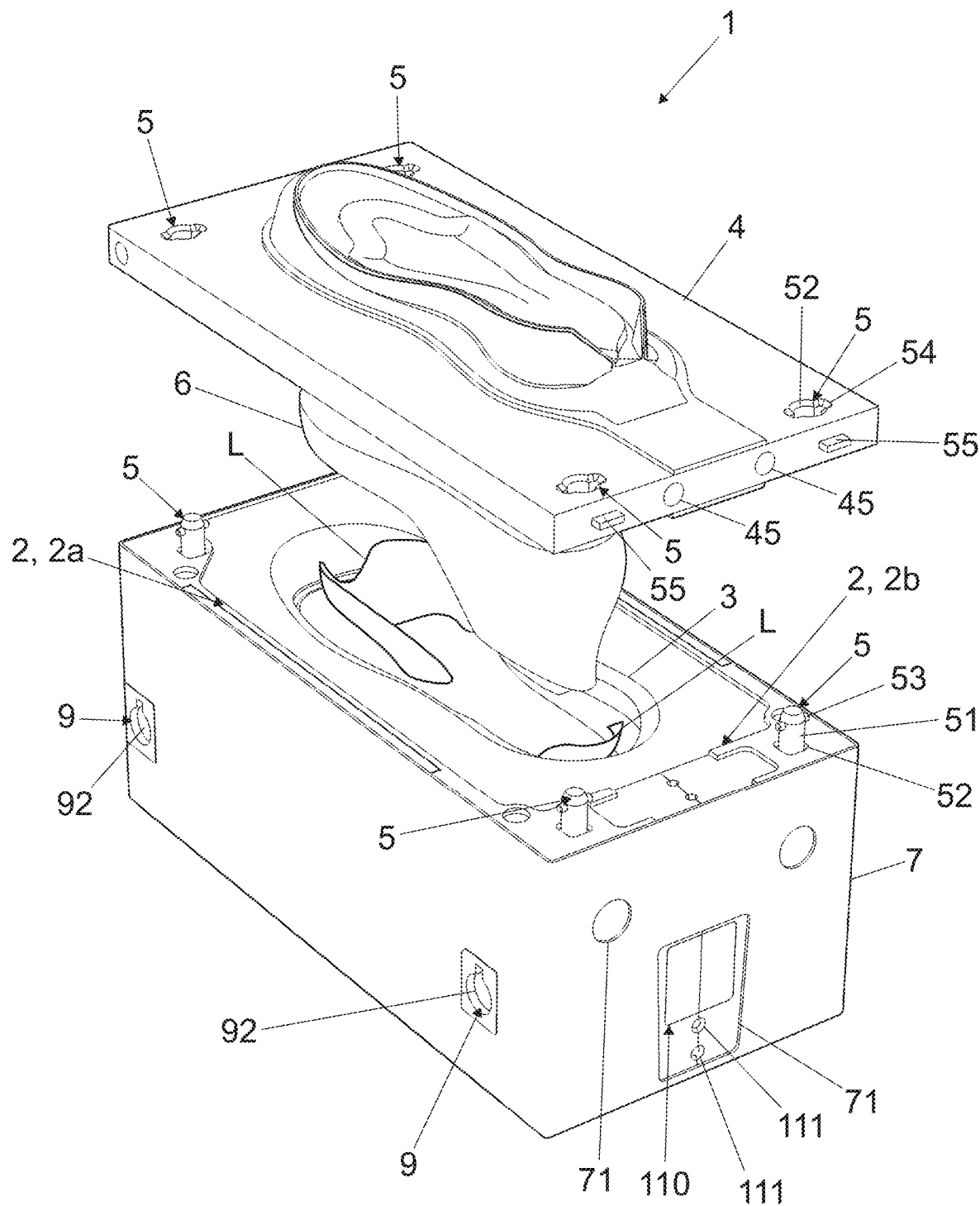
FIG. 2: Perspective view of a second exploded view of the mould of the present invention.
Figure 7:
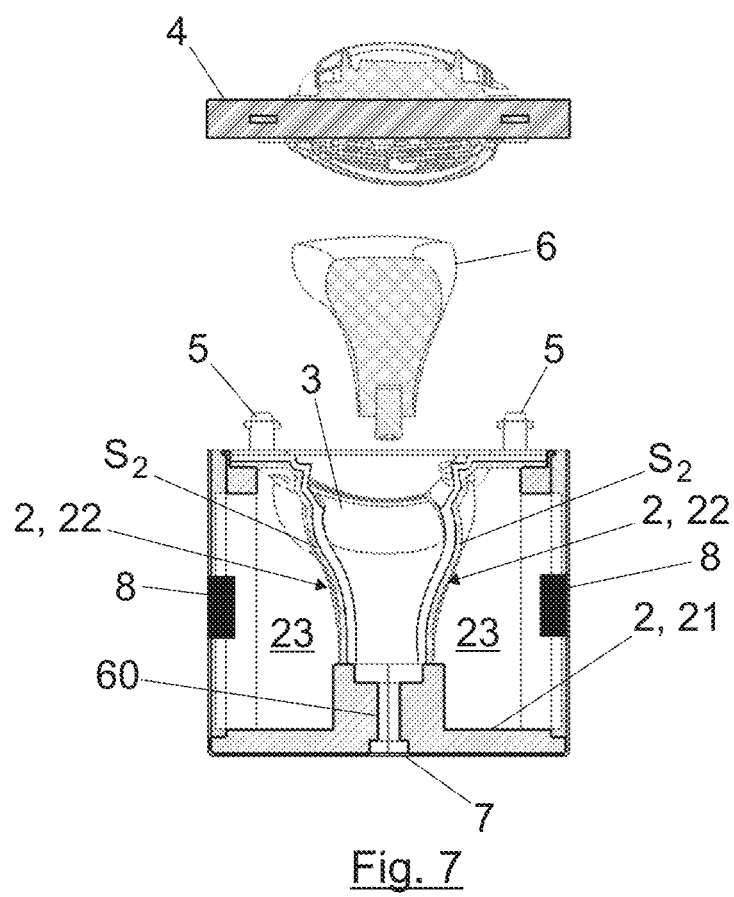
FIG. 7: Cross-sectional view along cutting line B-B' of FIG. 6.

As seen in FIGS. 1 and 2, the mould (1) for manufacturing three-dimensional items with flexible walls of the present invention comprises:
- a body (2) which defines an internal surface ($S_2$), see FIG. 7;
- an elastically deformable template (3), for example made of silicone (which also has an impermeable nature that does not enable the passage of air), which is fitted on said internal surface ($S_2$) and which is configured to receive one or more laminar parts (L) of an item to be manufactured;
- a lid (4) configured to close said body (2), the template (3) staying arranged between the body (2) and the lid (4); and
- incorporated closing and opening means (5) configured to keep the body (2) and the lid (4) joined during the transport/movement of the mould (1).

This configuration enables the mould (1) to be kept closed without needing to be connected or fastened to a machine. This gives it the advantage of being able to move to any other point of the manufacturing plant or process line, see FIG. 39.

The body (2) comprises:
- a first lateral part (2a) which defines a first portion ($S_{2a}$) of the internal surface ($S_2$) whereon the template (3) is fitted; and
- a second lateral part (2b) which defines a second portion ($S_{2b}$) of the internal surface ($S_2$) whereon the template (3) is fitted;

wherein the first lateral part (2a) and the second lateral part (2b) are joined together when the lid (4) is joined to the body (2), and configured to move in opposite directions ($d_{2a}$, $d_{2b}$) once the lid (4) is removed from the body (2). This enables the mould (1) to be opened laterally, once the lateral parts (L) are arranged on the template (3), in order to in turn enable the introduction of a countermould (6), or last (6) for manufacturing footwear, see FIG. 9b.

Moreover, in order to prevent the loss of the vacuum inside the mould (1) in said situation, which could cause the lateral parts (L) to be displaced, the first lateral part (2a) and the second lateral part (2b) are jointly covered by an elastic cover (7) configured to prevent the entry of external air when both lateral parts (2a, 2b) are separated. To enable the interaction of actuations and/or external elements with the mould (1), the elastic cover (7) also comprises a plurality of openings or windows (71) with different shapes and sizes to make some functional and/or connecting elements thereof visible, such as for example; the incorporated closing and opening means (5), the lateral closing and opening means (9), the air extraction nozzle (25) of the vacuum chamber (23), injection holes (111) for molten material, electrical connectors, etc.

The incorporated closing and opening means (5) are integrated into the mould (1) itself, or make up part of it, and which move together with said mould (1) along the production line keeping the lid (4) closed against the body (2).

According to the present example, the incorporated closing and opening means (5) comprise:
- a plurality of upper latches (51), one for each corner of the mould (1), wherein each one runs through an upper hole (52) extending from the body (2) to the lid (4), at the end of which it has an upper closing element (53) configured to join the body (2) to the lid (4); and
- at least one locking element (54) which works in collaboration with the upper closing element (53); and
- at least one unlocking actuation (55) configured to release the closing element (53) from the locking element (54).

According to the present example, each unlocking actuation (55), or key, comprises an inner spring (not shown), such that when said spring is pressed by means of the unlocking actuation (55), the upper closure (53) is released from the locking element (54). On the contrary, if no action is taken on the unlocking actuation (55), the upper closure (53) stays locked, preventing the opening of the lid (4).

The described configuration increases the accessibility of the incorporated closing and opening means (5), such that they can be easily actuated from the outside by actuating, for example, on the contour of the lid (4).

Figure 3:
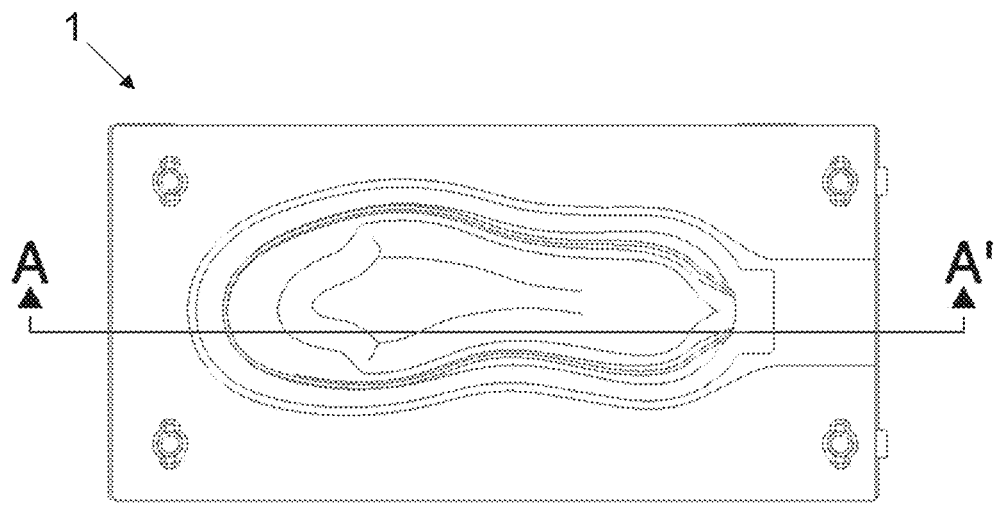
FIG. 3: Top plan view of the mould of the present invention.

FIG. 3 shows a plan view of the mould (1).

Figure 4:
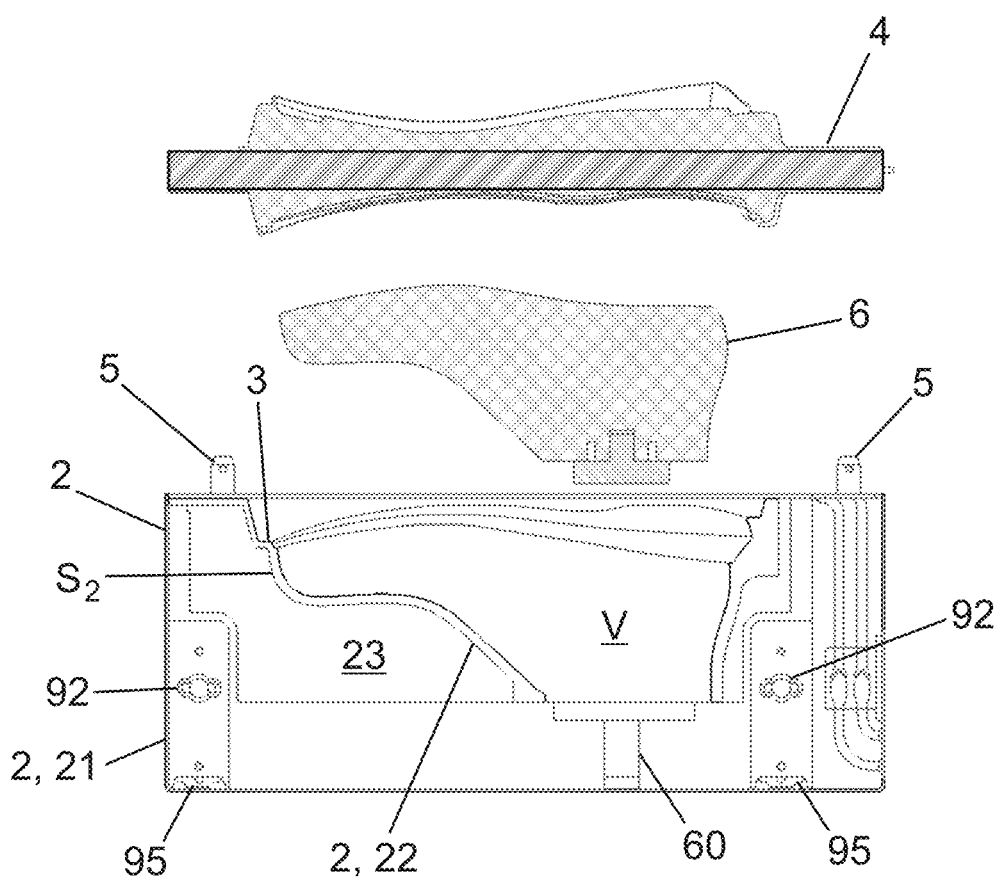
FIG. 4: Cross-sectional view along cutting line A-A' of FIG. 3.
Figure 9A:
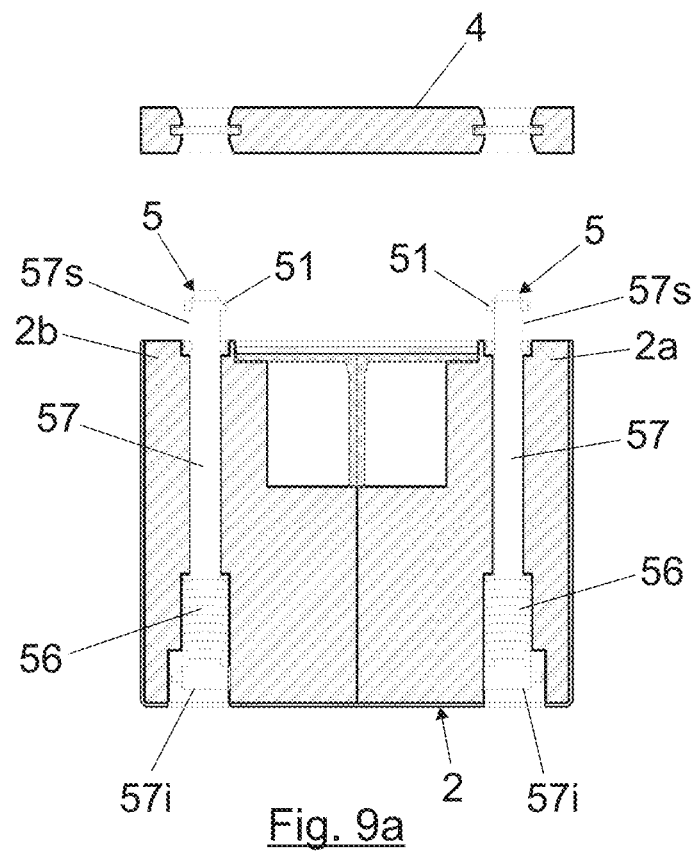
FIG. 9a: Cross-sectional view along cutting line D-D of FIG. 6.
Figure 9B:
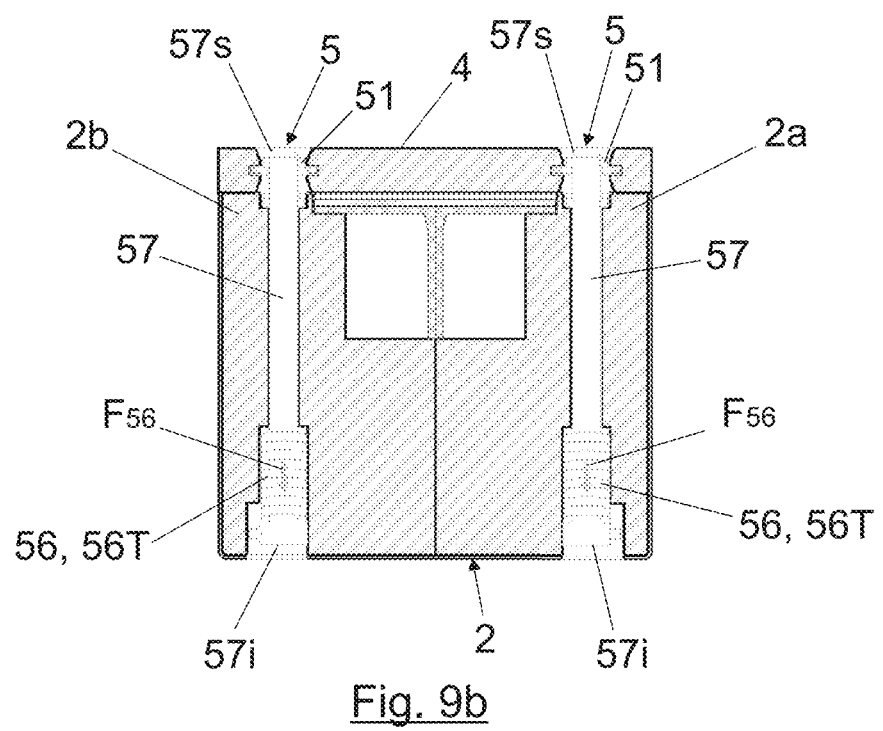
FIG. 9b: Cross-sectional view according to FIG. 9a, with the lid joined to the body of the mould.

As seen in FIG. 4, the mould (1) comprises a countermould (6), or last (6) for manufacturing footwear, which occupies a defined volume (V) between the template (3) and the lid (4), and which is configured to press the laminar parts (L) against the template (3) when the body (2) and the lid (4) are joined, see FIG. 9b.

The body (2) comprises a demoulding hole (60) configured to enable the passage of an external demoulding element for extracting the last (6) by pushing on it with said external demoulding element. In this manner, once the item has been manufactured, the last (6) can be extracted from it.

Figure 5:
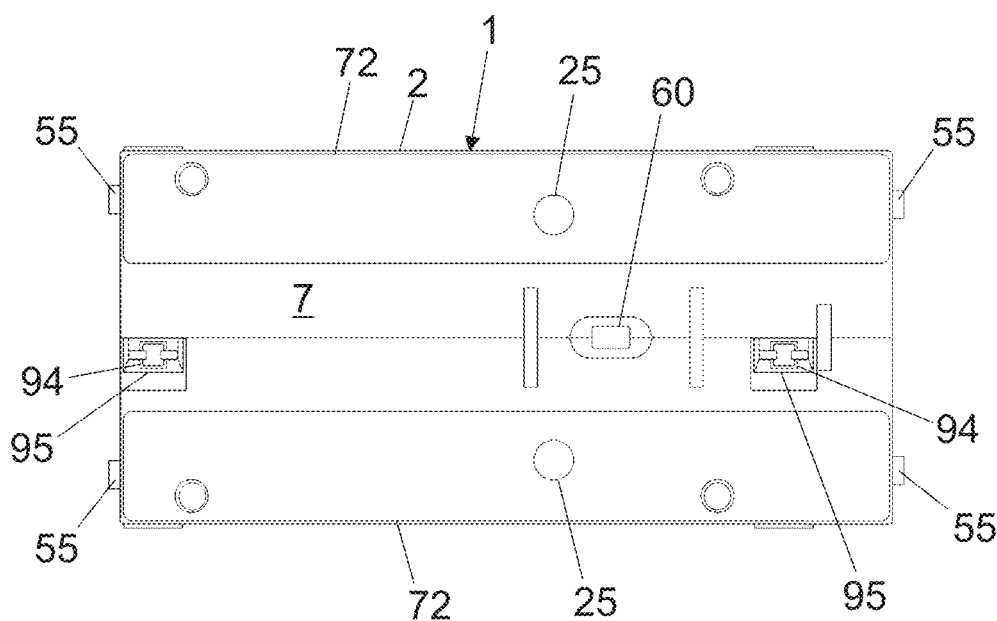
FIG. 5: Bottom plan view of the mould of the present invention.

FIG. 5 shows a bottom view of the mould (1) wherein the different elements which enable the interaction of the mould (1) with a machine for handling it can be seen in greater detail.

Specifically, the mould (1) comprises four unlocking actuations (55), each of them configured to release a closing element (53) from the incorporated closing and opening means (5).

Moreover, there are also two lower holes (95) located in the central portion which provide access to two other lower actuations (94) each one configured to unlock a closing element (93) of the lateral closing and opening means (9).

Also seen from another point of view is the demoulding hole (60) configured to enable the passage of an external demoulding element for extracting the last (6), as well as the air extraction nozzles (25) of the vacuum chamber (23).

Finally, to increase the sliding and/or mobility of the mould (1) along the process line, the elastic cover (7) comprises on the external lower face thereof, or support face, two metal plates (72) to prevent friction that the plastic material of the cover would cause on other transport elements (conveyor belts, etc.) and/or machinery (work stations, etc.).

Figure 6:
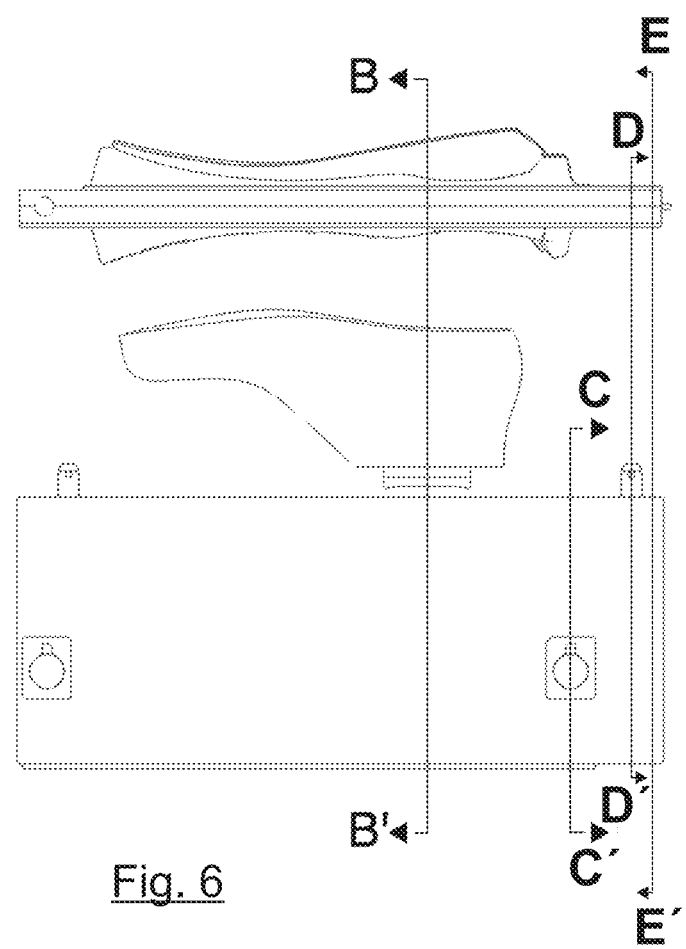
FIG. 6: Side view of a third exploded view of the mould of the present invention.

FIG. 6 shows a side view of a third exploded view of the mould (1).

As seen in FIG. 7, the body (2) comprises:
- a fixed portion (21) whereon the mould (1) is supported; and
- an interchangeable portion (22) wherein the internal surface ($S_2$) of the body (2) is defined and whereon the template (3) is fitted, and which is configured to be removably mounted on the fixed portion (21), see FIGS. 9a and 9b.

The fixed portion (21), or chassis, acts as a support element and/or structural element of the mould, regardless of the model and/or the size of the item to be manufactured, for which reason said fixed portion (21) is shared by a large number of items, as well as a large number of models and/or sizes thereof. Moreover, the interchangeable portion (22) is what determines the shape, size and/or features of the design of each item to be manufactured. Therefore, with a smaller number of components and/or parts of the mould (1), a larger number of different items can be manufactured. Likewise, the fixed portion (21) and the interchangeable portion (22) have complementary shapes which facilitate the assembly and replacement thereof in a quick and easy manner.

The fixed portion (21) is made of metal material, such as aluminium, while the interchangeable portion (22) is made of plastic material which is easily produced by means of 3D printing.

The mould (1) comprises two electric heaters (8) arranged inside the body (2) which are thermally insulated from the outside of said body (2) by an elastic cover (7).

Figure 8:
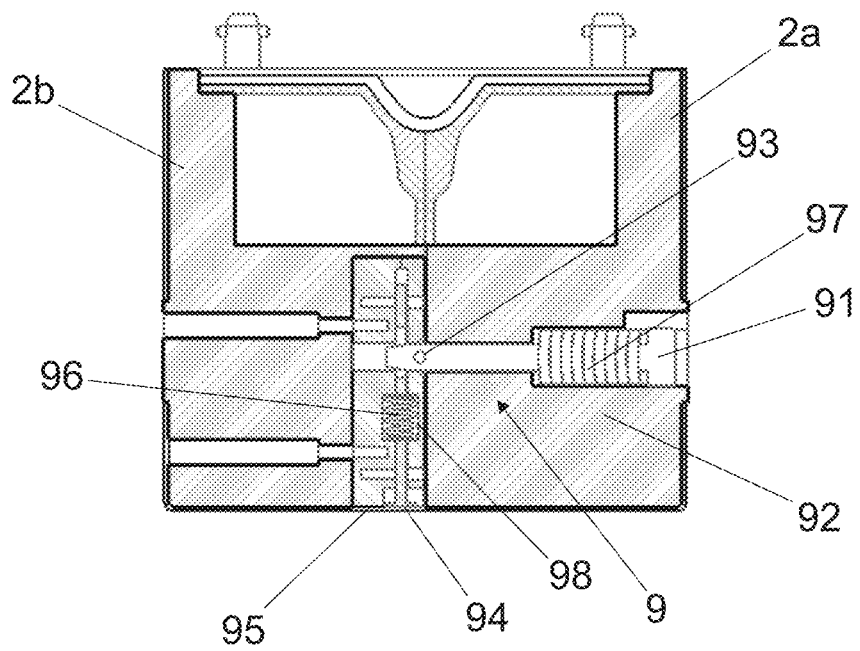
FIG. 8: Cross-sectional view along cutting line C-C' of FIG. 6.

As seen in FIG. 8, the mould (1) comprises lateral closing and opening means (9) configured to keep the first lateral part (2a) and the second lateral part (2b) joined, and to enable a subsequent lateral separation thereof, which are formed by:
- at least one lateral latch (91), equipped with a first spring (97), which runs through a lateral hole (92) of the body (2), at the end of which it has a lateral closing element (93) configured to join the first lateral part (2a) to the second lateral part (2b); and
- at least one lower actuation (94), equipped with a second spring (98), which runs through a lower hole (95) of the body (2), at the end of which it has a lateral opening element (96) configured to unlock the closing element (93) of the lateral latch (91).

The described configuration increases the accessibility of the lateral closing and opening means (9), such that they can be easily actuated from the outside by actuating on the lateral faces of the mould (1) and on the lower face thereof.

As seen in FIGS. 9a and 9b, according to the present example, the incorporated closing and opening means (5) additionally comprise at least one closing spring (56) configured to press the lid (4) against the body (2) when both are joined, FIG. 9b.

To do so, the incorporated closing and opening means (5) comprise at least one rod (57) which has:
- an upper end (57s) whereon the upper latch (51) is arranged; and
- a lower end (57i) whereon the closing spring (56) is arranged;
wherein the closing spring (56) is in a compressed position (56T) when the lid (4) is joined to the body (2) in order to exert a downward pushing force ($F_{56}$) against the lower end (57i) of the rod (57).

In any case, the presence of the closing springs (56) and the elements associated with them are an optional complement to the closure means (5) described above, the purpose of which is to offer a better securing of the lid (4) to the body (2) during the transport of the mould (1). Meaning, the incorporated closing and opening means (5) formed by elements (51, 52, 53, 54, 55) can likewise function properly without the presence of the closing springs (56).

Figure 10A:
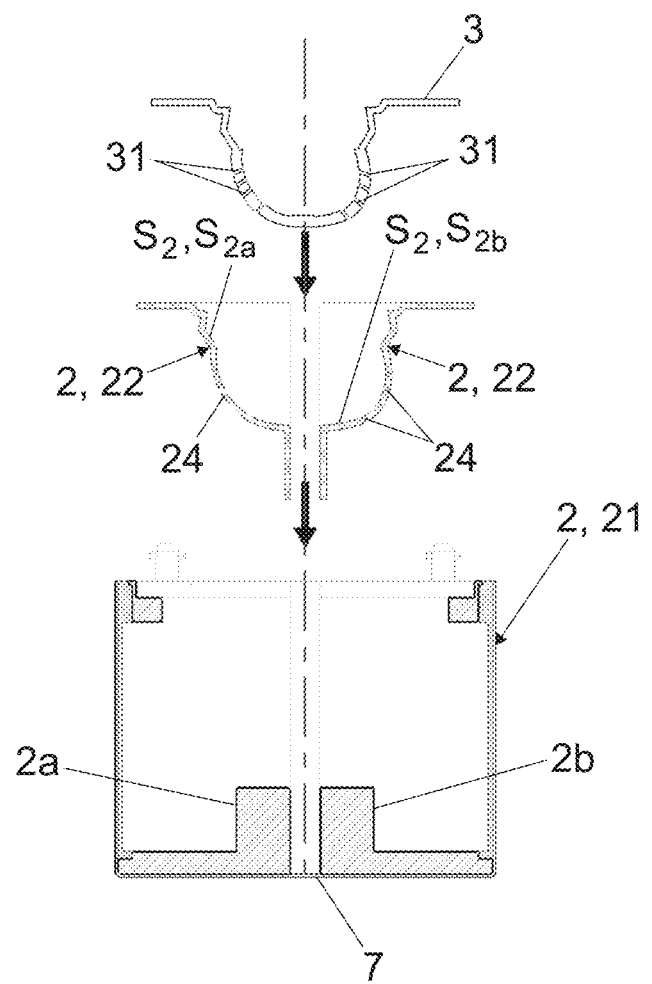

As seen in FIGS. 10a and 10b, the body (2) comprises:
- a vacuum chamber (23) that communicates with a plurality of suction holes (24) that reach the internal surface ($S_2$) of the body (2); and
- an extraction nozzle (25) which enables the air to be extracted from the vacuum chamber (23).

In turn, the template (3) includes:
- a plurality of holes (31) in communication with the suction holes (24), configured to attract one or more laminar parts (L) of the item to be manufactured against said template (3) when the air is extracted from the vacuum chamber (23).

As stated above, the body (2) comprises:
- a first lateral part (2a) which defines a first portion ($S_{2a}$) of the internal surface ($S_2$) whereon the template (3) is fitted; and
- a second lateral part (2b) which defines a second portion ($S_{2b}$) of the internal surface ($S_2$) whereon the template (3) is fitted;
- wherein the first lateral part (2a) and the second lateral part (2b) are joined together when the lid (4) is joined to the body (2), and configured to move in opposite directions ($d_{2a}$, $d_{2b}$) once the lid (4) is removed from the body (2). This enables the mould (1) to be opened laterally, once the lateral parts (L) are arranged on the template (3), in order to in turn enable the last (6) to be introduced, see FIG. 9b.

The elastically deformable template (3) fitted on the internal surface ($S_2$) portions ($S_{2a}$, $S_{2b}$) of the body (2), in combination with the elastic cover (7), which is also deformable, enable said body (2) to be kept airtight despite the separation between the first lateral part (2a) and the second lateral part (2b).

As seen in FIG. 10c, the lid (4) comprises:
- a first face (41) which defines a first countermould (42) associated with a first volume ($V_1$) of the item to be manufactured; and
- a second face (43) which defines a second countermould (44) associated with a second volume ($V_2$) of the item to be manufactured;
- wherein the lid (4) is reversible which enables the body (2) to be closed through the first face (41) or the second face (43).

The contour of the lid (4) has securing elements (45) which facilitate the lid (4) being turned over by external turning elements, see FIG. 2.

Figure 10D:
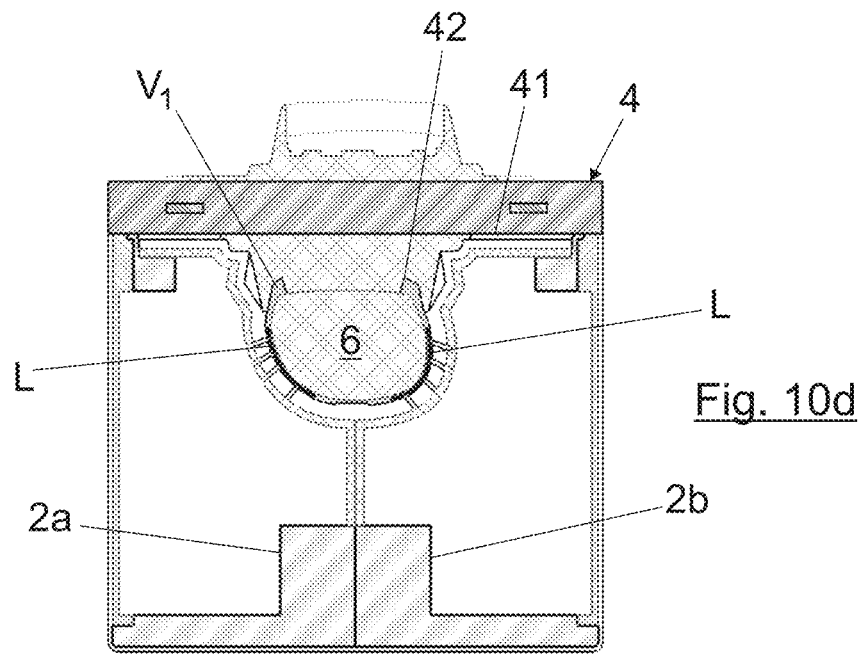
Figure 10E:
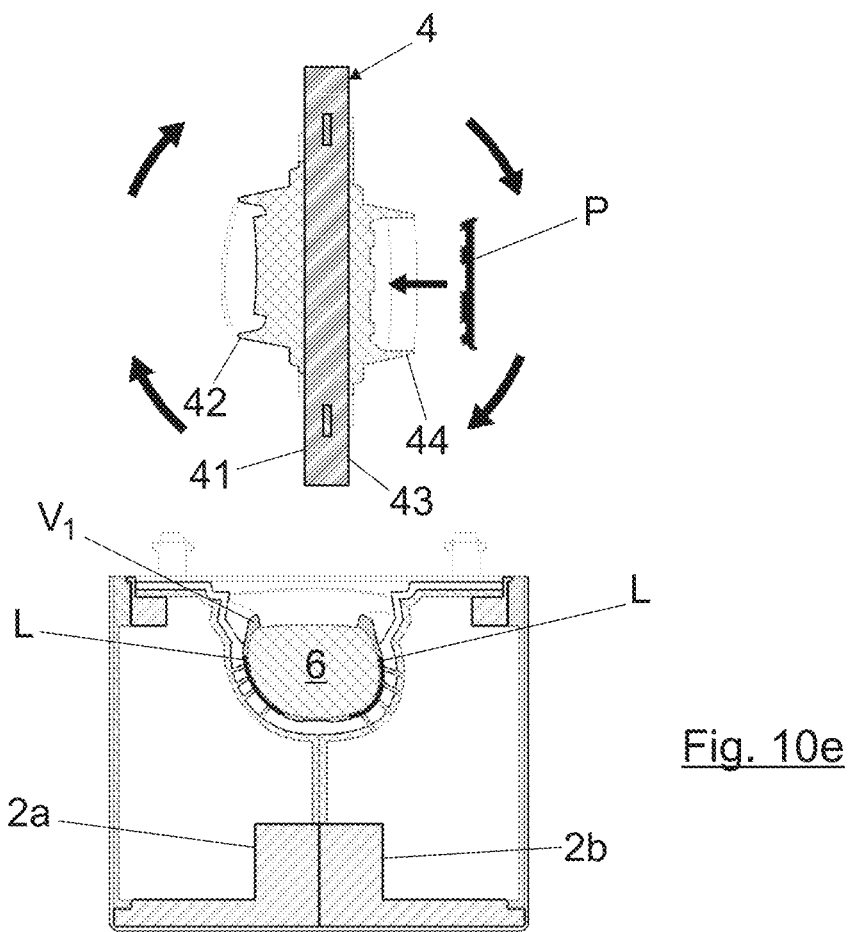
Figure 10F:
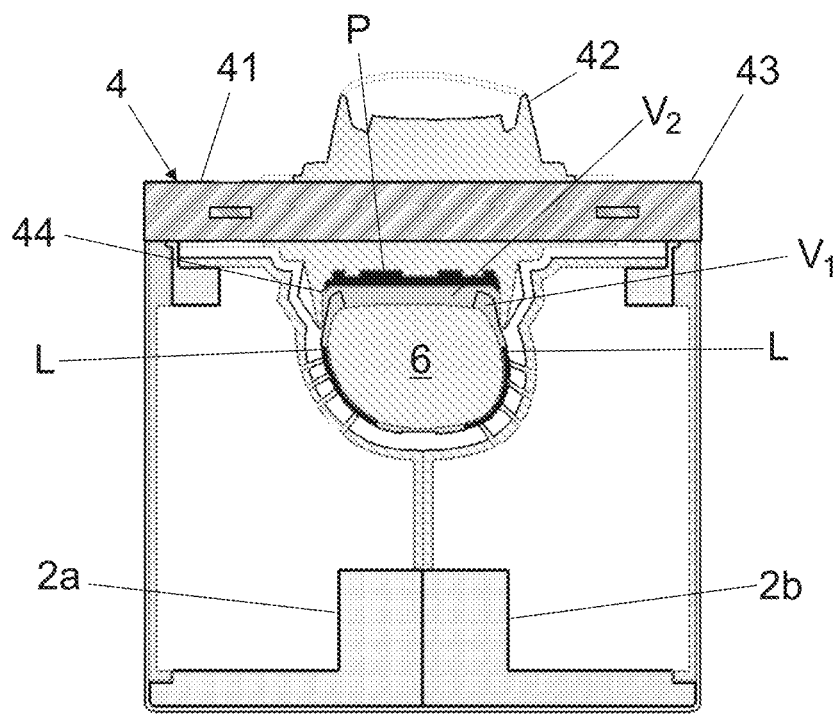

FIGS. 10d-10f show a sequence of operations wherein the reversible character of the lid (4) is seen. In FIG. 10d, the lid (4) is closed on the first face (41), such that a first injection of plastic material fills the first volume ($V_1$) in order to define a first element of the item to be manufactured. FIG. 10e shows the moment when the lid (4) is turned over in order to close it on the body (2) on the second face (43) thereof. This process is taken advantage of in order to introduce another component of the item to be manufactured, in this case, the outermost portion of the sole (P). In FIG. 10f, the lid (4) is closed on the second face (41), such that a second injection of plastic material fills the second volume ($V_2$) in order to define a second element of the item to be manufactured.

Figure 11:
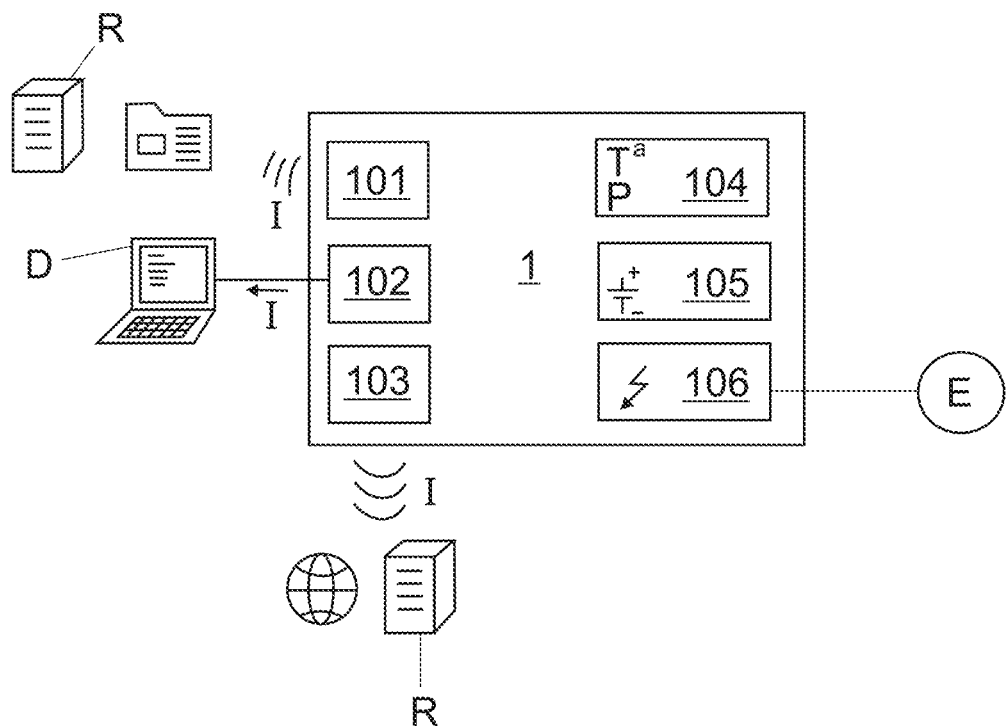
FIG. 11: Schematic diagram of the power and control elements of the mould.
Figure 12A:
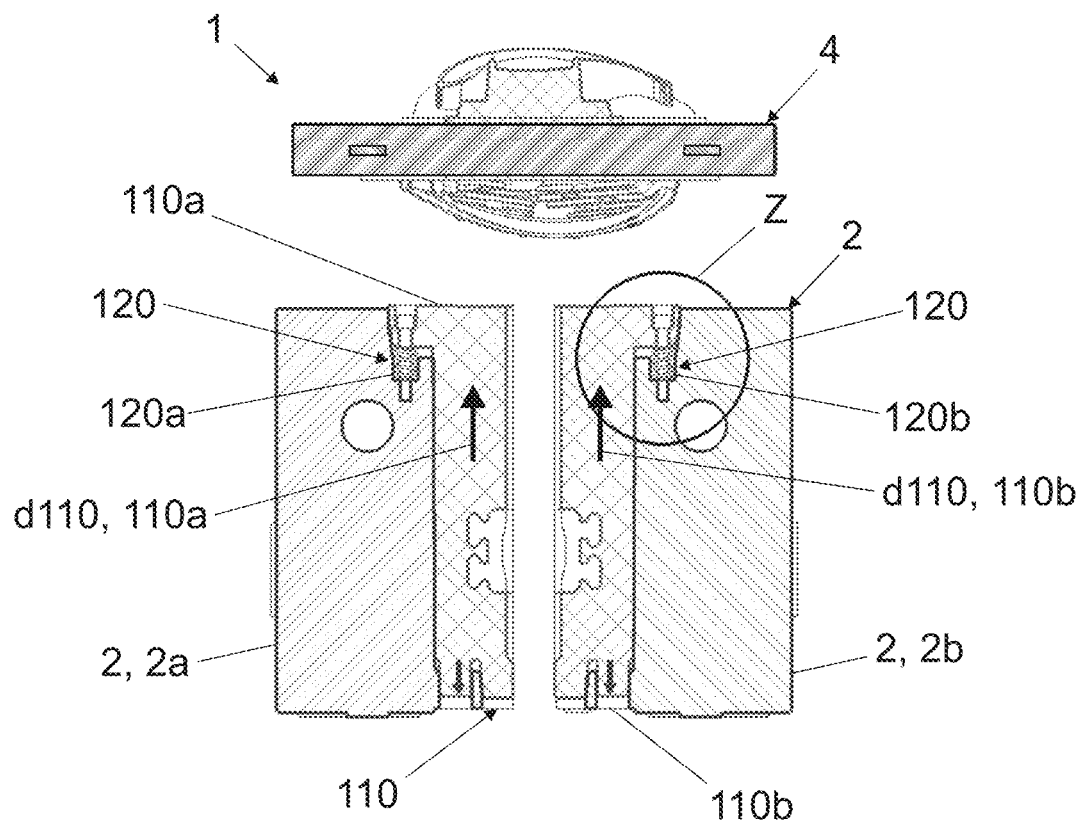
FIG. 12a: Cross-sectional view along cutting line E-E' of FIG. 6, without the last and with the lid open.
Figure 12B:
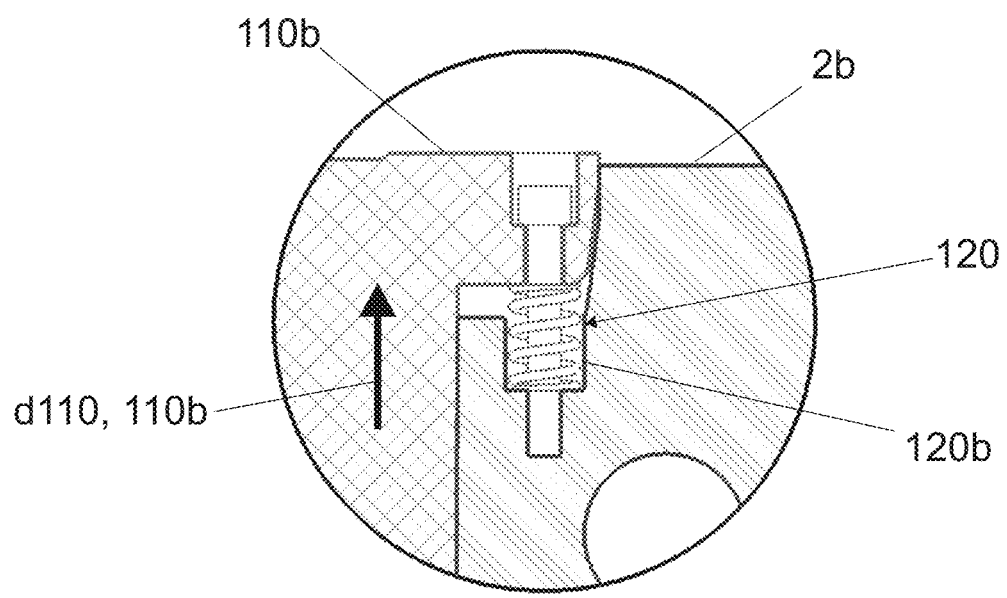
Figure 13A:
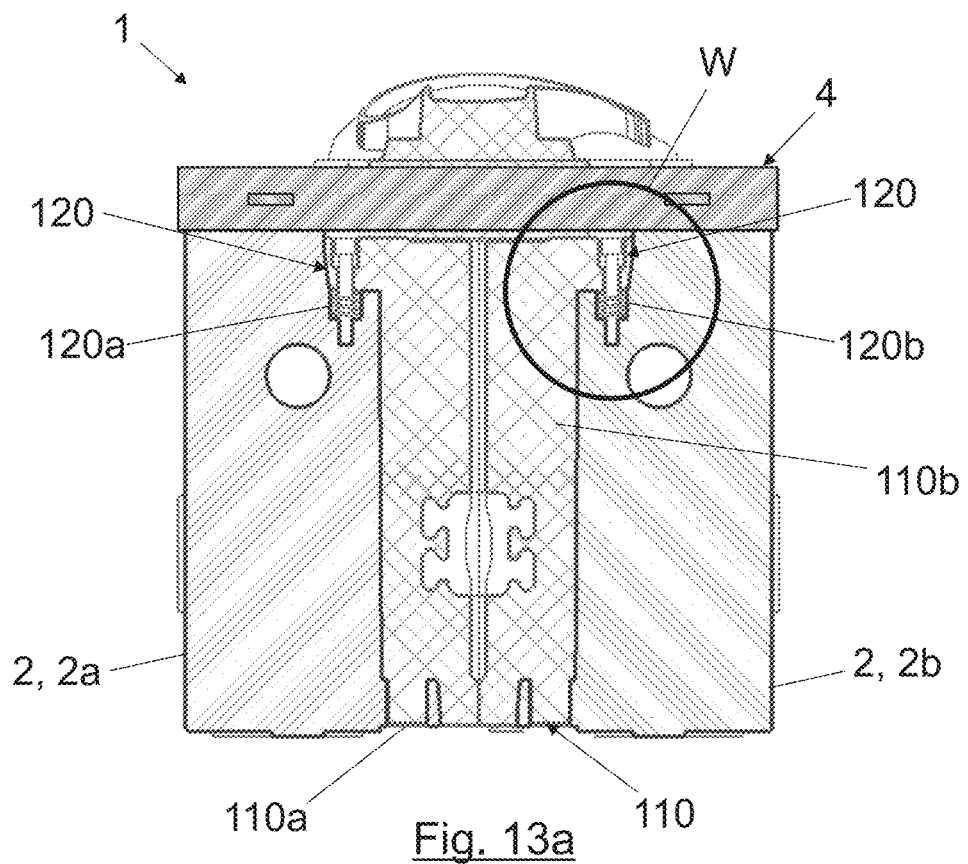
FIG. 13a: Cross-sectional view along cutting line E-E' of FIG. 6, without the last and with the lid closed.
Figure 13B:
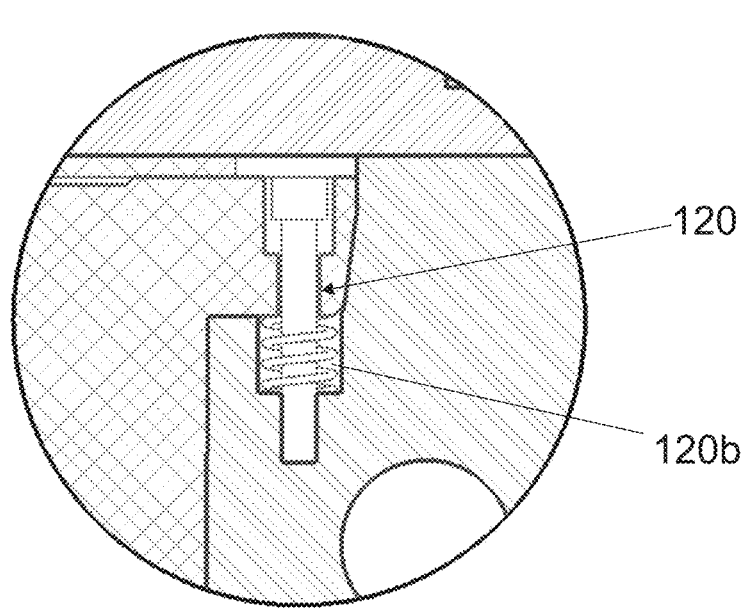

As seen in the diagram of FIG. 11, the mould (1) comprises remote identification means (101) configured to transmit information (I) about the mould (1) by means of radio frequency to a data network (R). In this manner, the central data system of the manufacturing plant can receive said information (I) and send the corresponding orders to the mould (1) for the operation thereof.

The mould (1) comprises:
- local identification means (102) configured to transmit information (I) about the mould (1) by means of wiring and/or direct connection to an electronic device (D);
- wireless connection means (103) configured to connect to the Internet and/or a data network (R); and
- pressure and temperature sensors (104) to know the physical conditions therein.

The mould (1) is electrically powered from an incorporated power source (105) by means of one or more batteries arranged therein, and/or from an external power source (E) through an electrical socket (106) arranged therein.

FIGS. 12a, 12b, 13a and 13b show in greater detail the configuration and operations of the injection mechanism (110) of the mould (1). As seen, said injection mechanism (110) is formed by a first injection block (110a) associated with the first lateral part (2a), and by a second injection block (110b) associated with the second lateral part (2b). Both blocks (110a, 110b) are able to be separated from each other, see FIG. 12a, and between them the injection channels (112) are formed which have outlet holes (113), see FIG. 1.

In turn, the injection mechanism (110) is configured to slide upwards ($d_{110}$) by means of the action exerted by an elastic mechanism (120) arranged between the body (2) and the lid (4). In this case, by the elastic force of a first spring (120a) and a second spring (120b). This causes upward sliding ($d_{110a}$, $d_{110b}$) of each of the blocks (110a, 110b) with respect to the lateral parts (2a, 2b) when the lid (4) is open, see FIGS. 12a and 12b. On the contrary, when the lid (4) is closed, said injection blocks (110a, 110b) slide in the opposite direction from the elastic force of the springs (120a, 120b), thereby producing a pressure of the upper portion of the injection mechanism (110) against the lid (4), see FIGS. 13a and 13b. Said pressure ensures sealing during the closing of the mould (1), meaning, between the body (2) and the lid (4), preventing molten material from leaking out of the mould (1).

FIGS. 14-18 show a second embodiment of the mould (1) of the present invention.

Figure 14:
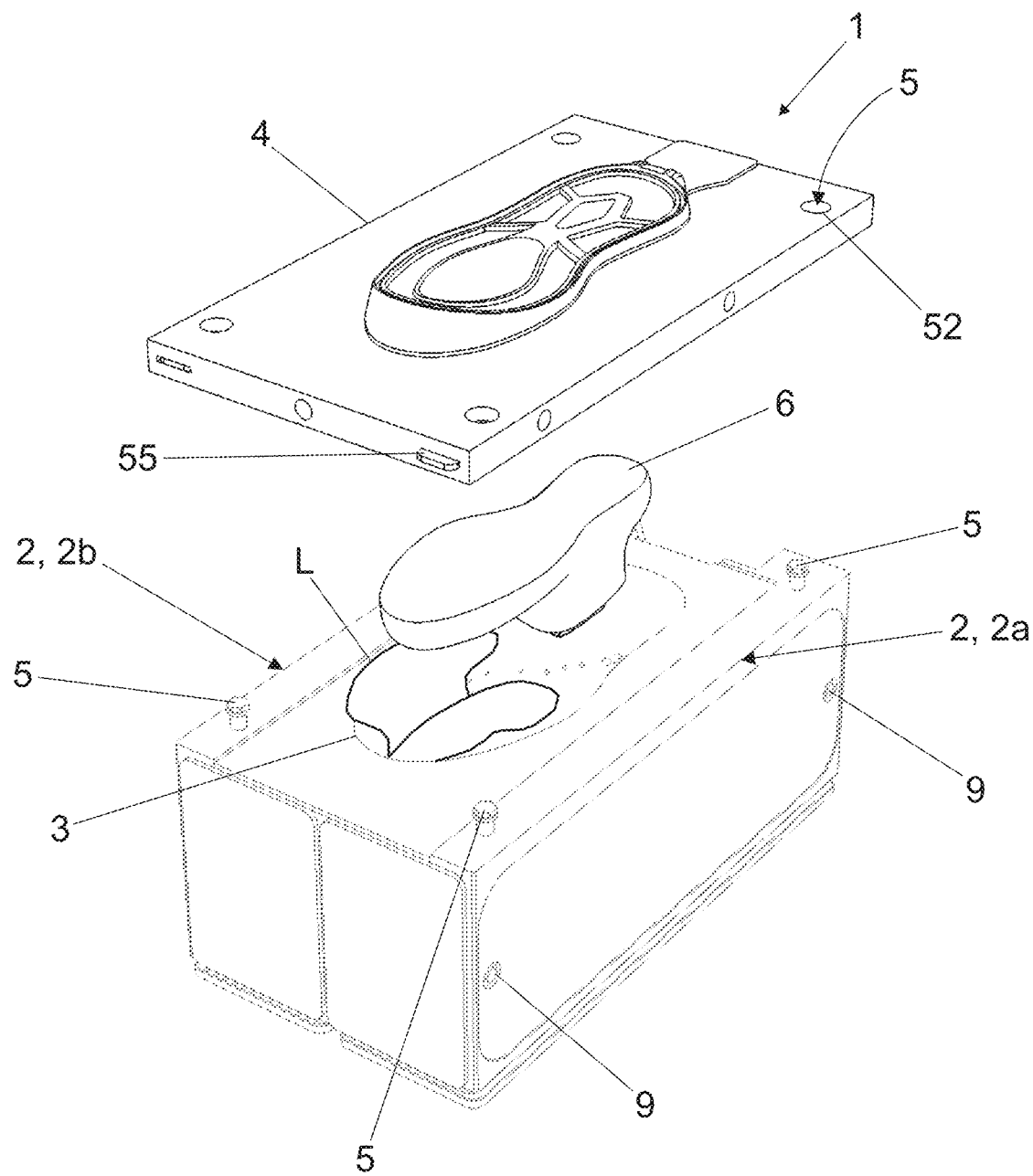
FIG. 14: Perspective view of a first exploded view of the mould of the present invention, according to a second embodiment.

As seen in FIG. 14, in the same manner as in the first embodiment, said mould (1) comprises:
- a body (2) which defines an internal surface ($S_2$), formed by a first lateral part (2a) and a second lateral part (2b);
- a lid (4) configured to close said body (2); and incorporated closing and opening means (5) configured to keep the body (2) and the lid (4) joined during the movement of said mould (1).

Likewise, said mould (1) may also comprise:
- an elastically deformable template (3) arranged between the body (2) and the lid (4), which fits on the internal surface ($S_2$) and which is configured to receive one or more laminar parts (L) of an item to be manufactured; and
- a countermould or last (6) which occupies a defined volume (V) between the body (2) and the lid (4), and is arranged between the template (3) and the lid (4), and which is configured to press the laminar parts (L) against the template (3) when the body (2) and the lid (4) are joined.

Figure 15:
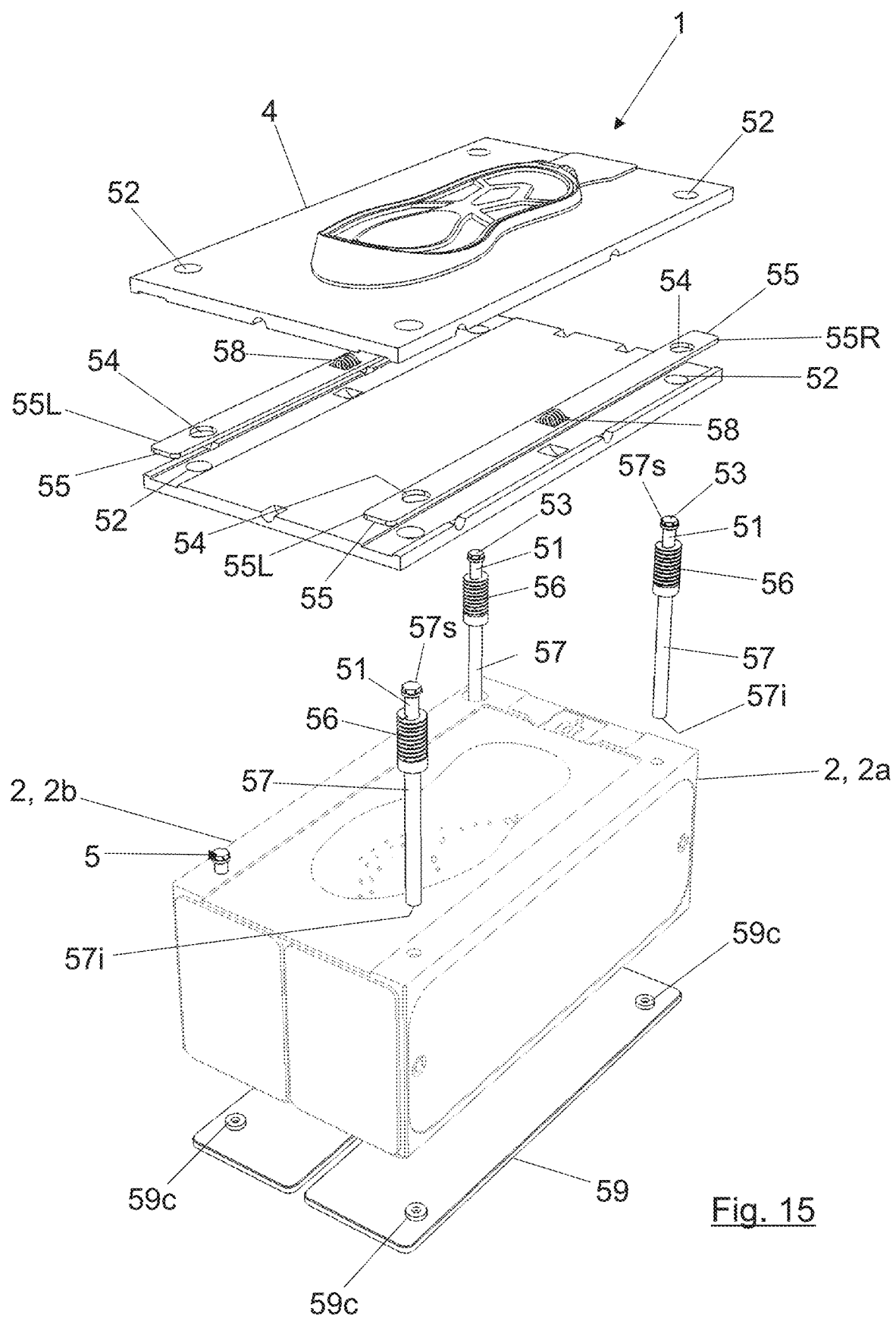
FIG. 15: Perspective view of a second exploded view of the mould of the present invention, according to the second embodiment.

As seen in FIG. 15, in the same manner as in the first embodiment, the incorporated closing and opening means (5) include:
- a plurality of upper latches (51), one for each corner of the mould (1), wherein each one runs through an upper hole (52) extending from the body (2) to the lid (4), at the end of which it has an upper closing element (53) configured to join the body (2) to the lid (4); and
- at least one locking element (54) which works in collaboration with the upper closing element (53); and
- at least one unlocking actuation (55) configured to release the closing element (53) from the locking element (54).

However, in this case, the lid (4) is crossed longitudinally by two unlocking actuations (55), configured as a platen or a bar, wherein each one comprises an inner spring (58) between two actuation ends (55L, 55R). Said inner spring (58) is configured to enable a slight linear displacement of the unlocking actuation (55) through the lid (4) until one of the actuation ends (55L, 55R) thereof or the other laterally protrudes from the lid (4). This enables the locking elements (54), each configured as a hole, to work in collaboration with the upper closing element (53) enabling the release or locking thereof, as seen in FIGS. 16a-16d.

Figure 16A:
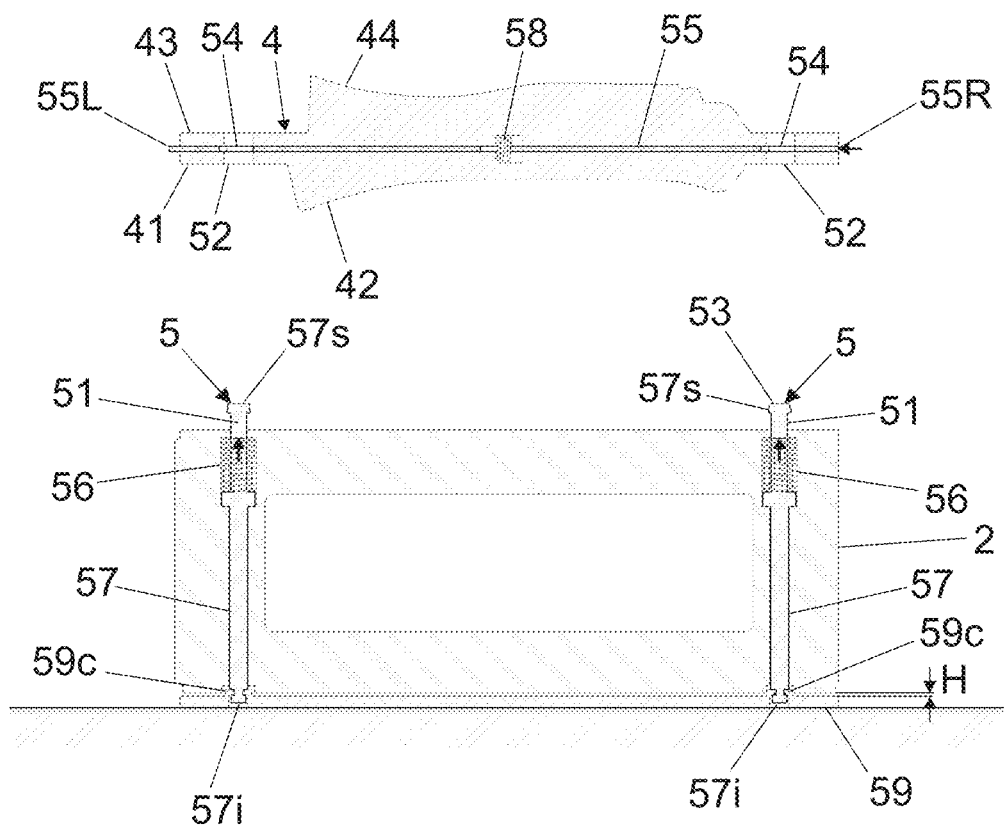
FIGS. 16a-16d: Sequence of joining the lid to the body of the mould, according to the second embodiment.
Figure 16B:
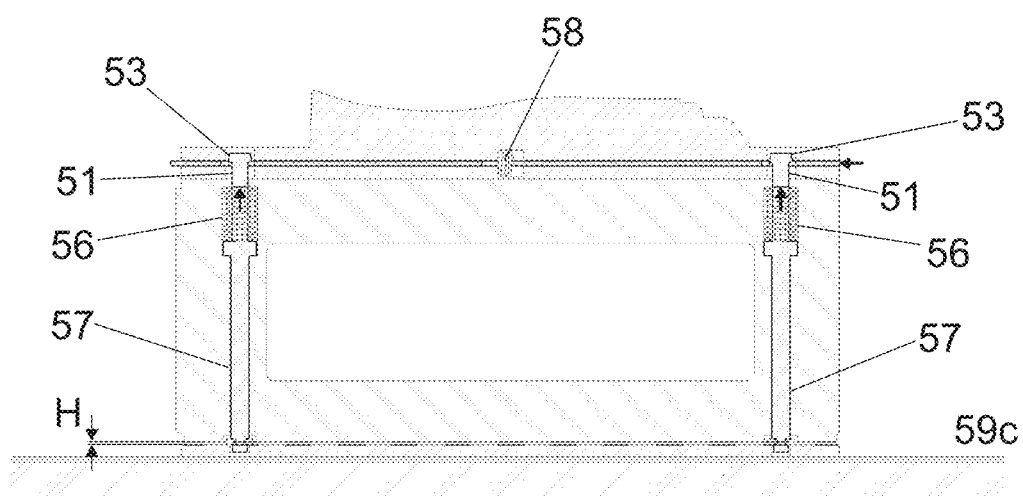
Figure 16C:
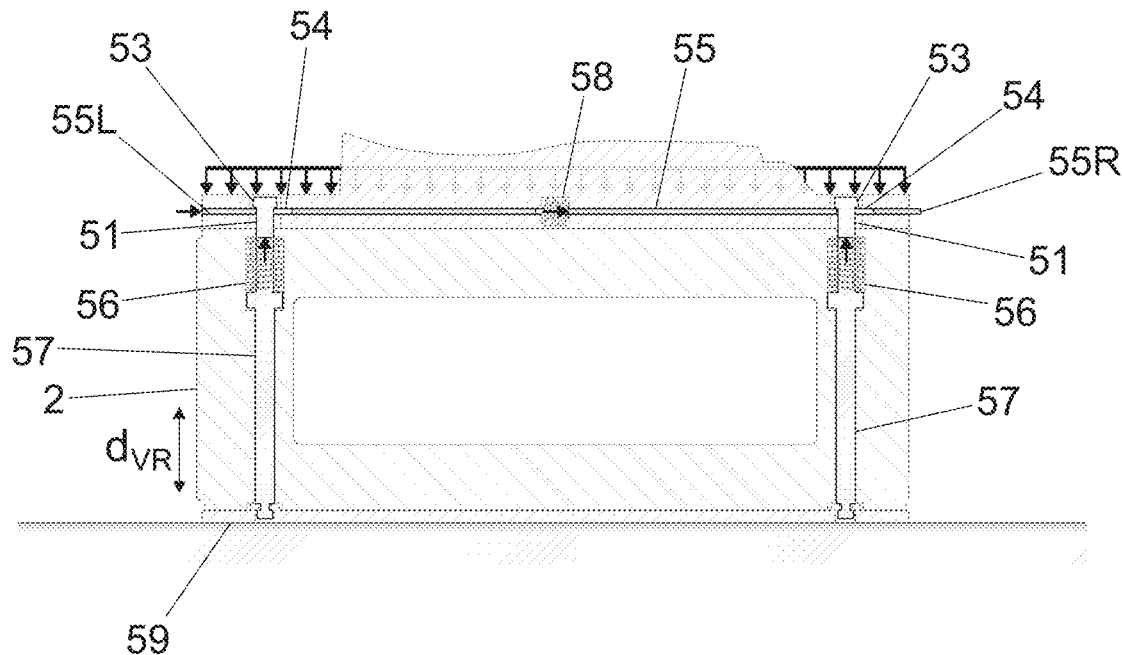
Figure 16D:
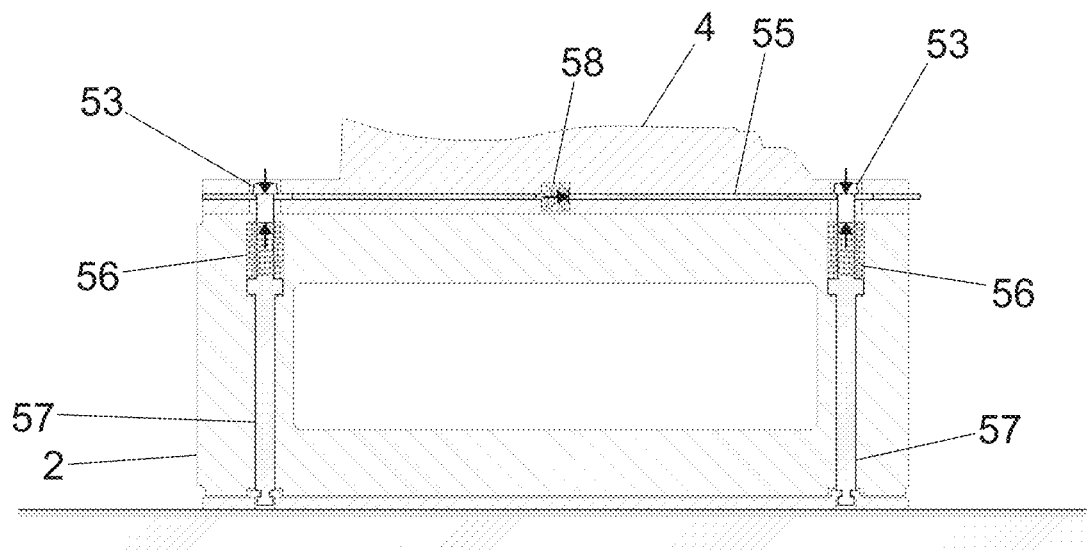

Likewise, in the same manner as in the first embodiment, the incorporated closing and opening means (5) comprise at least one closing spring (56) configured to press the lid (4) against the body (2) when both are joined, FIG. 16d. To do so, the closing and opening means (5) comprise at least one rod (57) which has an upper end (57s) whereon the upper latch (51) is arranged; and a lower end (57i).

However, in this case, each spring (56) is arranged at the upper end (57s) of the corresponding rod (57), while the lower end (57i) thereof is attached or joined to a support base (59) arranged underneath the body (2). Said joining prevents the vertical movement of the rods (57) with respect to the support base (59).

Moreover, each spring (56) is arranged on the corresponding rod (57) thereof, leaving a clearance (H) between the body (2) and the support base (59), enabling a relative vertical displacement ($d_{VR}$) between said elements (2, 59) when the spring (56) is compressed, FIGS. 16a-16d. A chock (59c) arranged at each joining of the lower end (57i) of the rods (57) with the support base (59) facilitates the fitting of the body (2) with the support base (59) when said relative vertical displacement ($d_{VR}$) is produced.

FIGS. 16a-16d show a sequence of joining the lid (4) to the body (2) of the mould (1), based on the incorporated closing and opening means (5) described for FIG. 15.

As seen in FIG. 16a, the lid (4) is separated from the body (2). In order to then close the body (2) with the lid (4), first, one of the actuation ends (55l, 55R) is pressed, in this case the right actuation end (55R), compressing the inner spring (58). This enables the locking elements (54), or holes, to be oriented, such that the closing elements (53) can pass through them. In this situation, there is a clearance (H) between the support base (59) and the lower portion of the body (2) due to the action of the springs (56).

As seen in FIG. 16b, the lid (4) comes into contact with the upper portion of the body (2), while still maintaining the clearance (H).

As seen in FIG. 16c, the pressure exerted on the lid (4) in turn acts on the springs (56) causing a relative vertical displacement ($d_{VR}$), between the body (2) and the support base (59). In this case, a downward movement of the body (2) towards the support base (59) until it comes into contact with it, eliminating the clearance (H). This enables, in the upper portion, the closing elements (53) to surpass the holes making up the locking elements (54). At that moment, the inner spring (58) is decompressed by pushing the unlocking elements (55) in the opposite direction, trapping the closing elements (53) underneath.

As seen in FIG. 16d, the body (2) stays closed by the lid (4) with the force of the springs (56).

Figure 17:
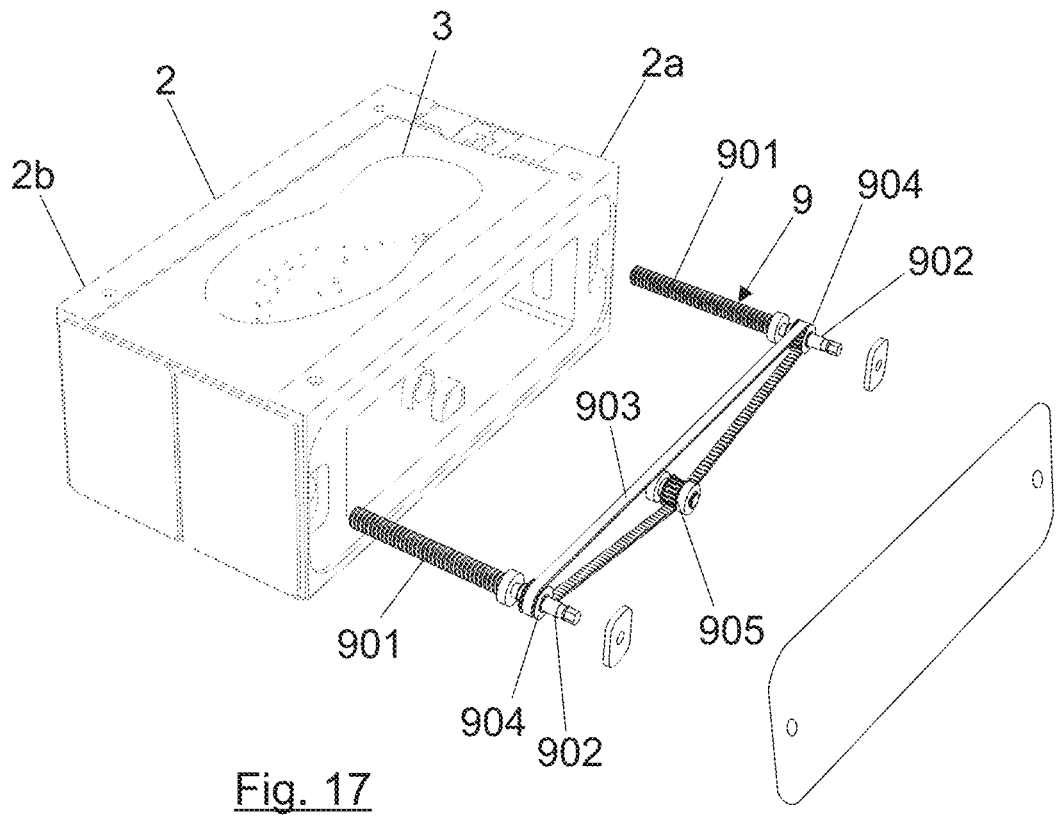
FIG. 17: Perspective view of an exploded view of the body of the mould of FIGS. 14 and 15.

As seen in FIG. 17, the mould (1) comprises lateral closing and opening means (9) configured to keep the first lateral part (2a) and the second lateral part (2b) joined, and to enable a subsequent lateral separation thereof.

In this case, the lateral closing and opening means (9) comprise:
- at least one lead screw (901), preferably two arranged parallel to each other, which laterally crosses through both lateral parts (2a, 2b) and which is configured to be threaded thereto; wherein the separation and subsequent joining of said lateral parts (2a, 2b) is performed by means of screwing/unscrewing said lead screw (901).

Each lead screw (901) comprises an actuation end (902) which protrudes from one of the lateral parts (2a, 2b) and/or is accessible from the outside of the body (2), the rotation of which causes the screwing/unscrewing of said lead screw (901).

Preferably, in the case of having two or more lead screws (901), the lateral closing and opening means (9) are engaged to enable the synchrony thereof, that is, the rotation on the actuating end (902) of one of them causes the screwing/unscrewing of all the lead screws (901). To do this, preferably, the lateral closing and opening means (9) comprise a toothed belt (903) which engages with a toothed pulley (904) securely arranged in each lead screw (901). Additionally, an intermediate toothed pulley (905) can be arranged anchored with the possibility of rotation inside the body (2) in order to stiffen the system and better redistribute the tensions on the toothed belt (903).

Figure 18:
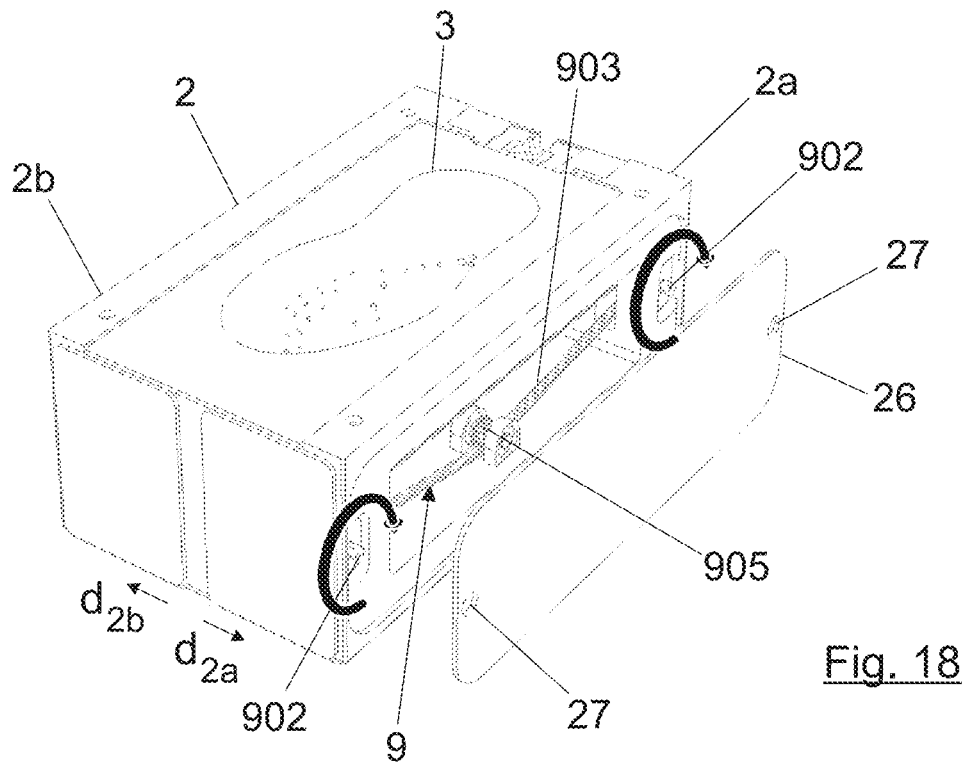
FIG. 18: Perspective view showing the mode of separation of the lateral parts of the mould of FIG. 17.

As seen in FIG. 18, when the lid (4) is removed from the body (2), the rotation on an actuating end (902) enables the lateral parts (2a, 2b) to move in opposite directions ($d_{2a}$, $d_{2b}$). For purposes of clarity, the plate (26) has been illustrated separately from the body (2), although it should be noted that the actuation ends (902) are accessible from outside the body (2), as they are shown and/or protrude from the access holes (27).

Figure 19:
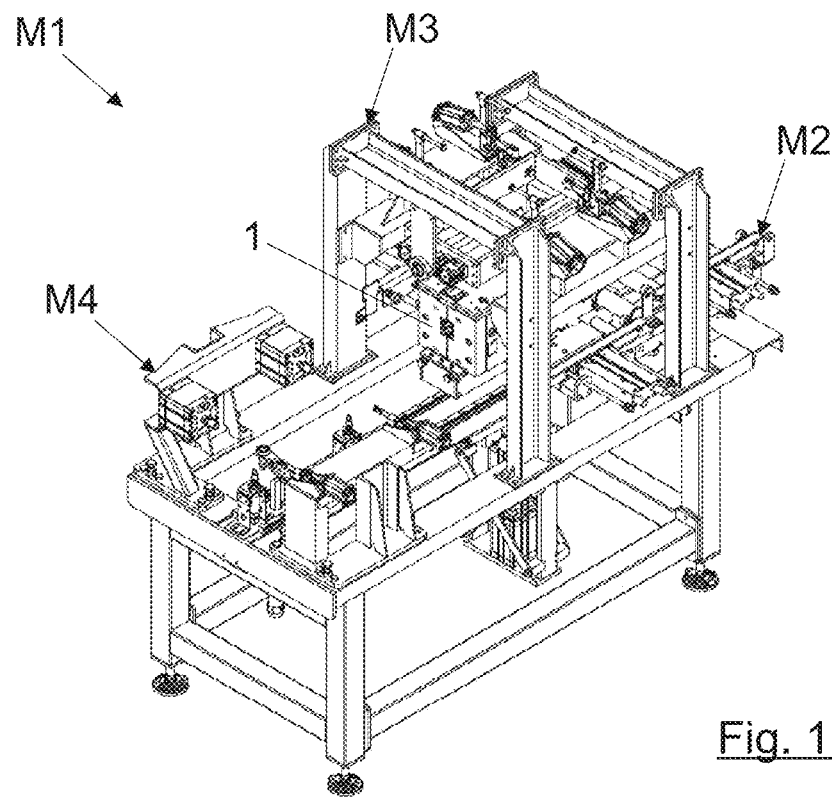
FIG. 19: Perspective view of the machine of the present invention.
Figure 20:
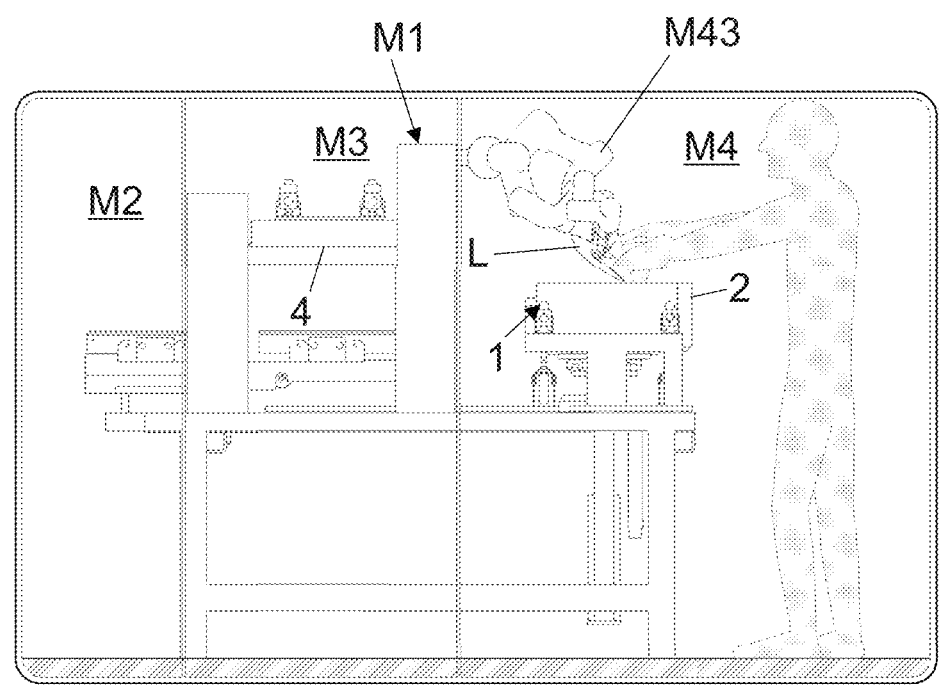
FIG. 20: Side view of the machine of the present invention.

As seen in FIGS. 19 and 20, the machine (M1) for manufacturing three-dimensional items of the present invention comprises:
  a receiving module (M2), or feed module, configured to receive a mould (1) formed by a body (2) and a lid (4) joined by means of incorporated closing and opening means (5);
  a conditioning module (M3) configured to receive the mould (1) from the receiving module (M2) and act on the incorporated closing and opening means (5) in order to separate the lid (4) from the body (2); and
  a handling module (M4) configured to receive the body (2) from the conditioning module (M3) and enable the placement of the components of the item to be manufactured.

As seen, the handling module (M4) comprises:
  a robotic mechanism (M43), in this case a double robot arm, configured to assist an operator in the placement within the body (2) of the components of the item to be manufactured.

It can also refer to the machine (M1) for manufacturing three-dimensional items of the present invention as an assembly machine, machine for handling independent moulds (1) and/or workstation for placing laminar parts of three-dimensional items with flexible walls.

Figure 21:
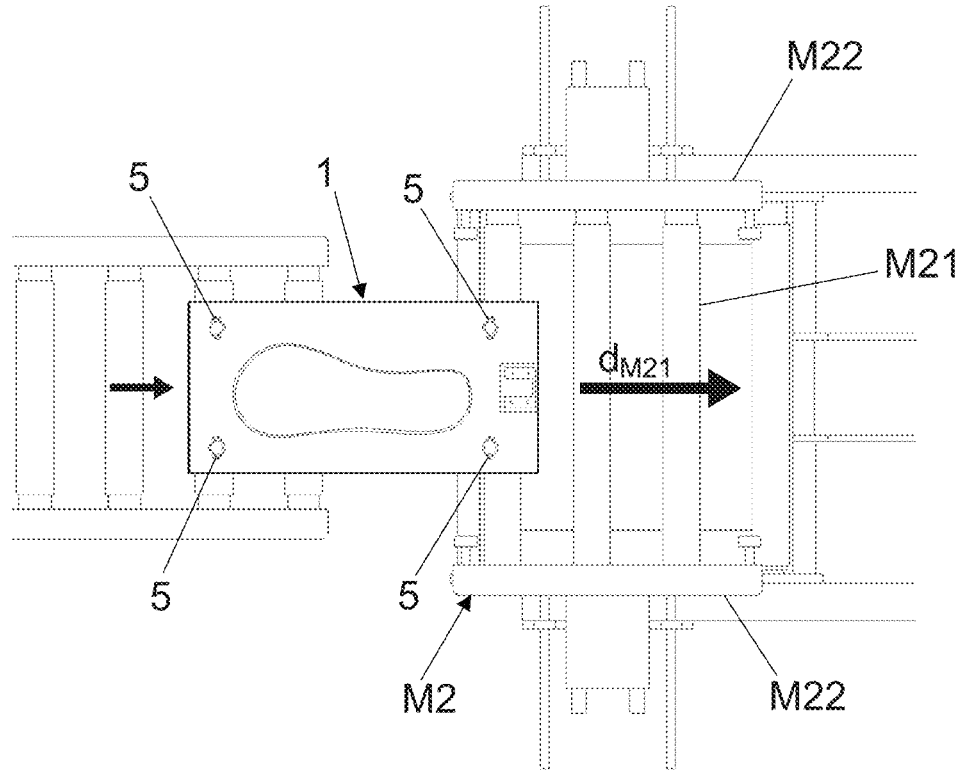
FIG. 21: Plan view of the receiving module receiving a mould.
Figure 22:
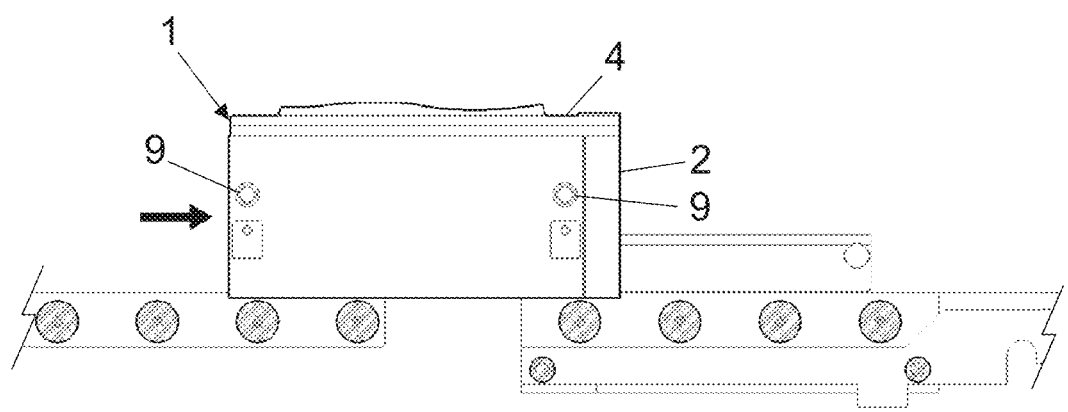
FIG. 22: Side view of the receiving module receiving a mould.

As seen in FIGS. 21 and 22, the receiving module (M2) comprises:
  a first conveyor belt (M21) configured to receive the mould (1); and
  a first alignment mechanism (M22) configured to align the mould (1) according to an advance direction ($d_{M21}$) of the first conveyor belt (M21).

Figure 23:
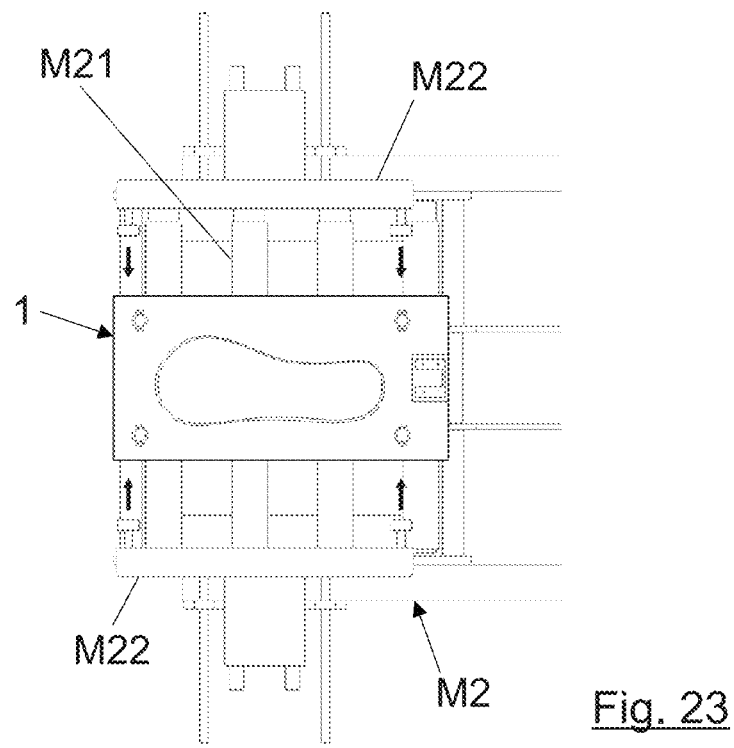
FIG. 23: Plan view of the receiving module performing the alignment of the mould.

FIG. 23 shows a plan view of the receiving module (M2) when the alignment of the mould (1) is carried out.

Figure 24:
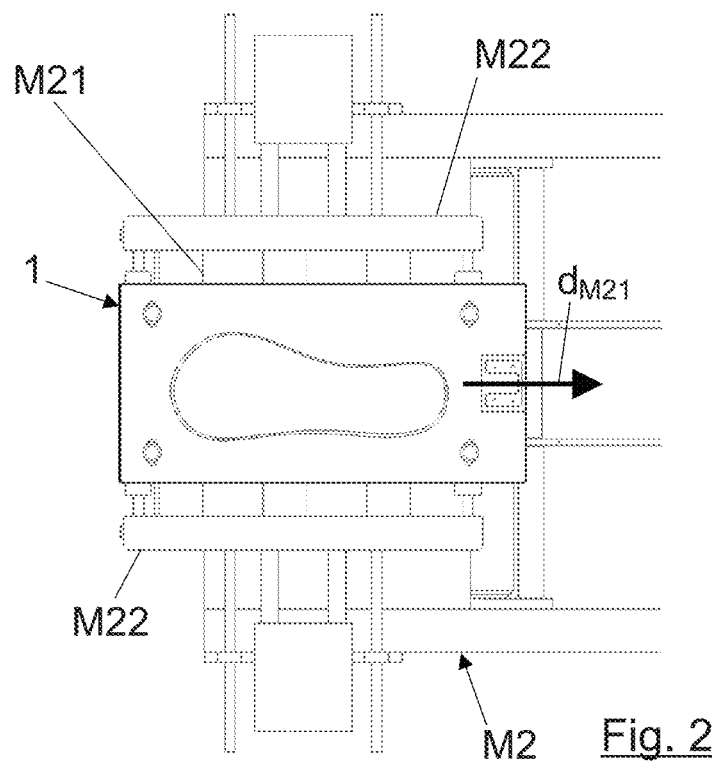
FIG. 24: Plan view of the receiving module with the mould aligned according to the advance direction.

FIG. 24 shows a plan view of the receiving module (M2) with the mould (1) aligned according to the advance direction ($d_{M21}$).

Figure 25:
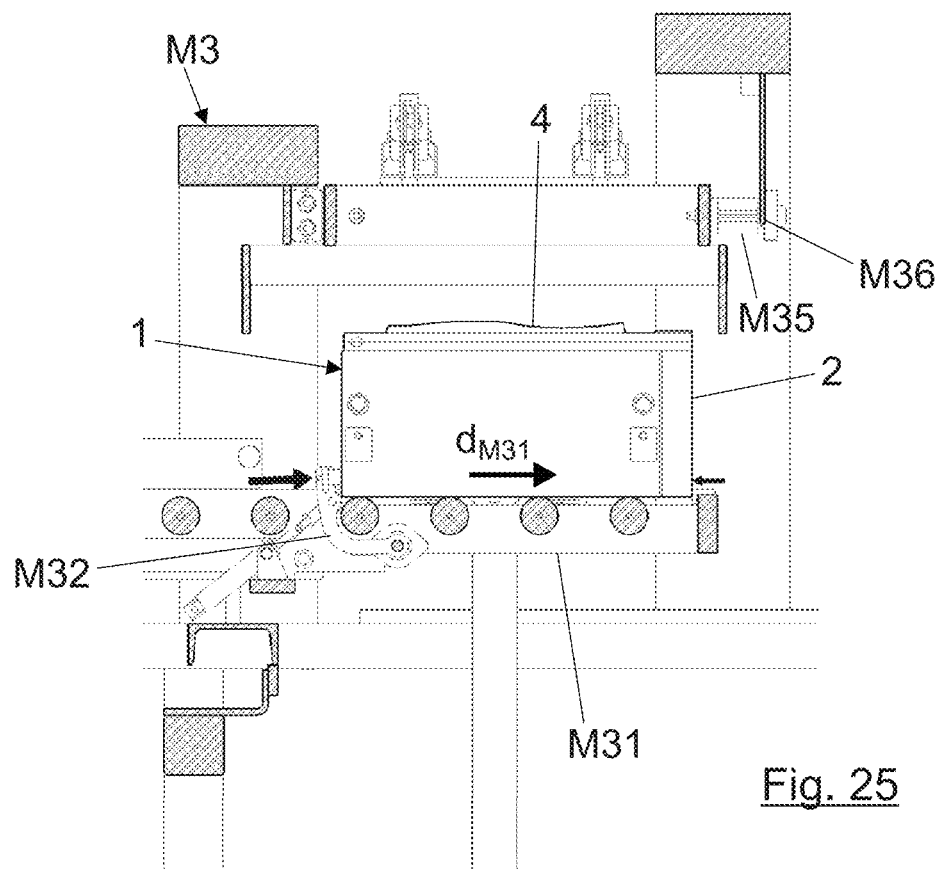
FIG. 25: Side view of the conditioning module performing the centring of the mould.
Figure 26:
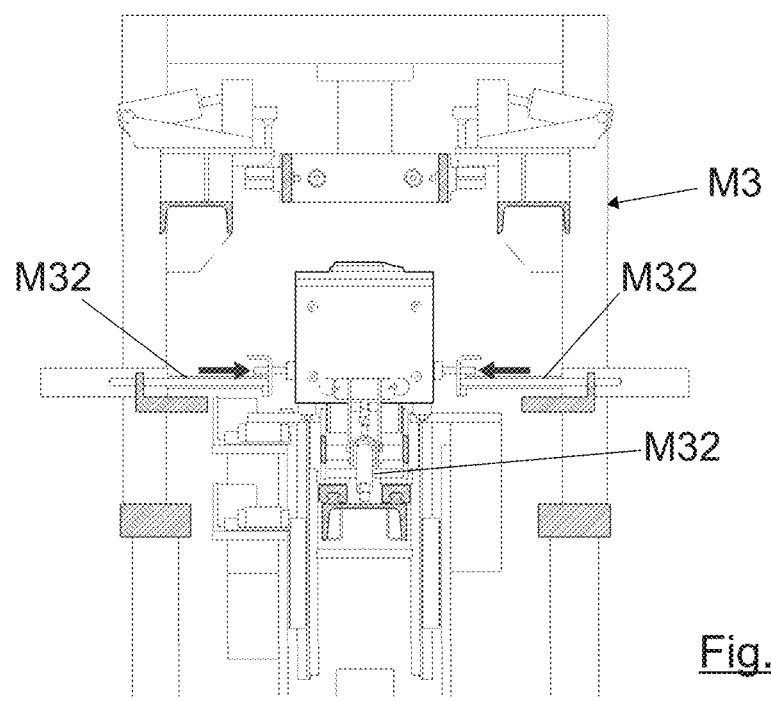
FIG. 26: Front view of the conditioning module with the mould centred according to the advance direction.

As seen in FIGS. 25 and 26, the conditioning module (M3) comprises:
  a second conveyor belt (M31) configured to receive the mould (1) from the receiving module (M2); and
  a second centring mechanism (M32) configured to centre the mould (1) horizontally, longitudinally and transversely according to an advance direction ($d_{M31}$) of the second conveyor belt (M31).

Figure 27:
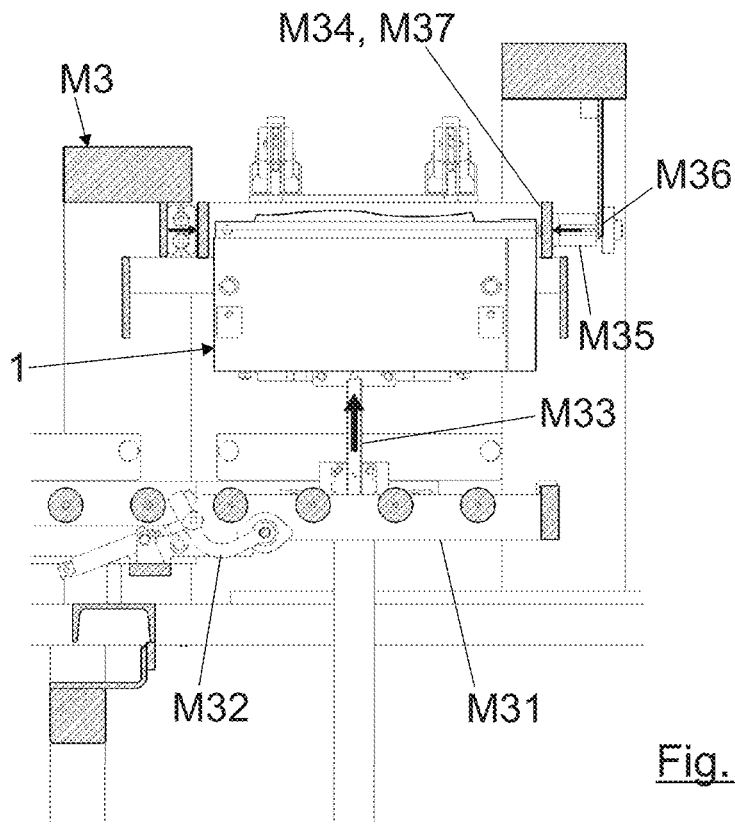
FIG. 27: Side view of the conditioning module performing the lifting of the mould.

FIG. 27 shows a side view of the conditioning module (M3) performing the lifting of the mould (1). As seen, the conditioning module (M3) comprises a lifting mechanism (M33) configured to lift the mould (1).

Figure 28:
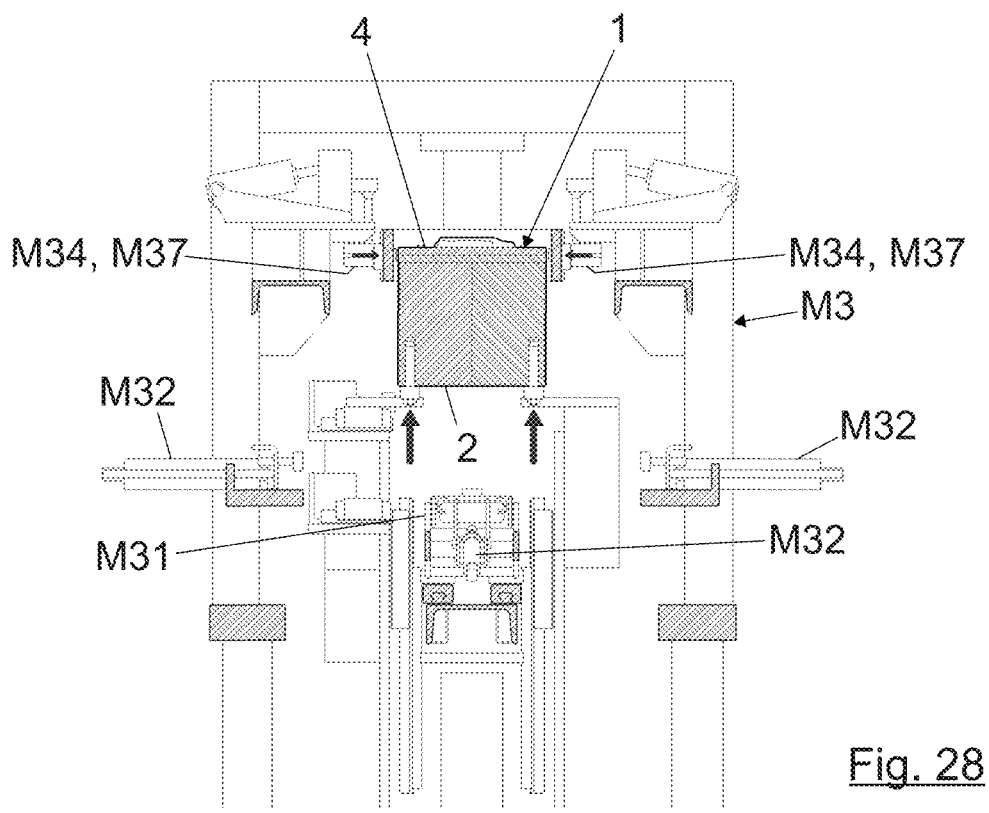
FIG. 28: Front view of the conditioning module performing the opening of the lid.

FIG. 28 shows a front view of the conditioning module (M3) performing the opening of the lid (4).

As seen, the conditioning module (M3) comprises:
  an opening mechanism (M34) configured to act on the incorporated closing and opening means (5) of the mould (1) and separate the lid (4) from the body (2); and
  a securing mechanism (M35) configured to secure the lid (4) once it is separated from the body (2).

As seen, the conditioning module (M3) comprises:
  a closing mechanism (M37) configured to act on the incorporated closing and opening means (5) of the mould (1) and join the lid (4) to the body (2) after said body (2) passes through the handling module (M4).

Figure 29:
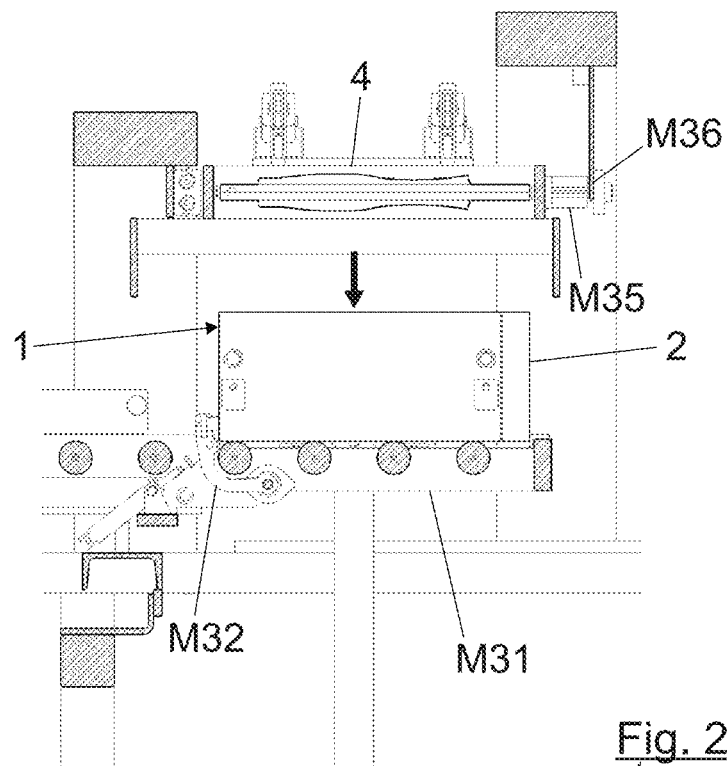
FIG. 29: Side view of the conditioning module performing the lowering of the body while the lid is secured above it.
Figure 30:
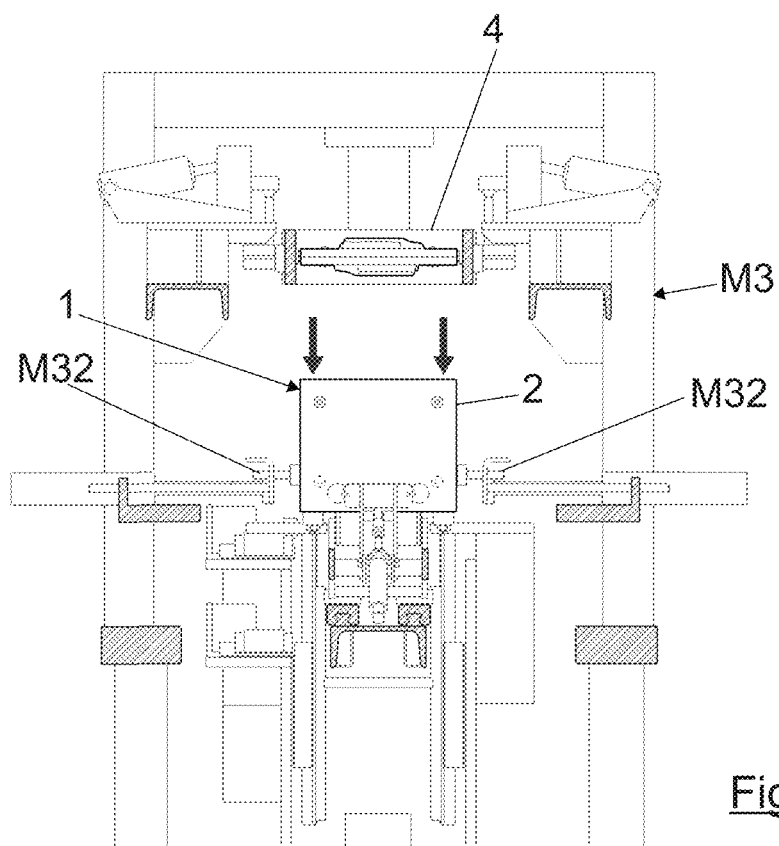
FIG. 30: Front view of the conditioning module performing the lowering of the body while the lid is secured above it

FIGS. 29 and 30, respectively, show a side view and a front view of the conditioning module (M3) performing the lowering of the body (2) while the lid (4) is secured above it.

Figure 31:
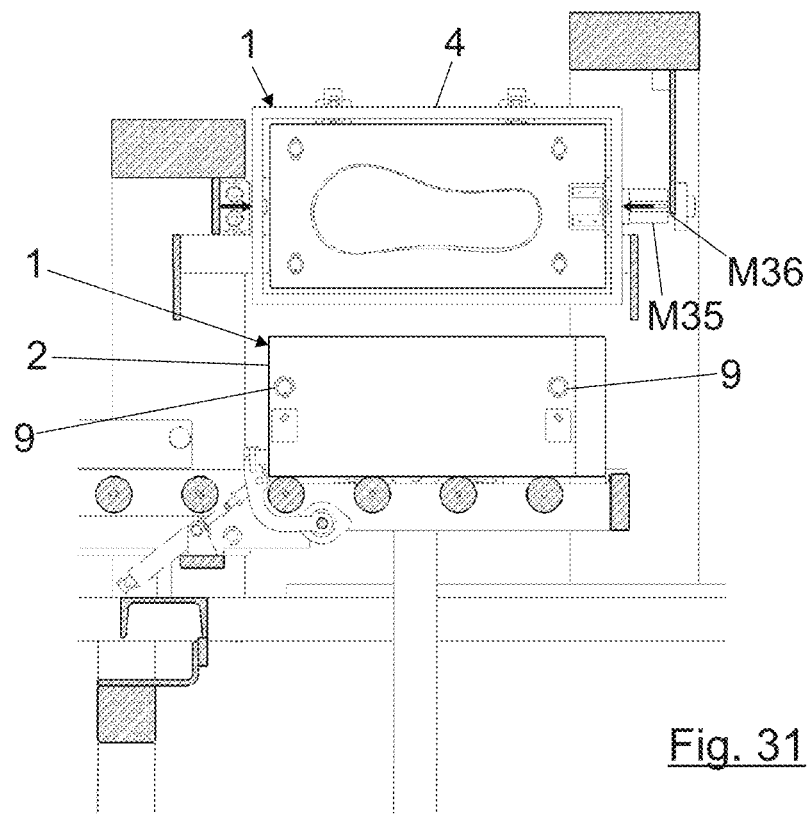
FIG. 31: Side view of the conditioning module turning over the lid.
Figure 32:
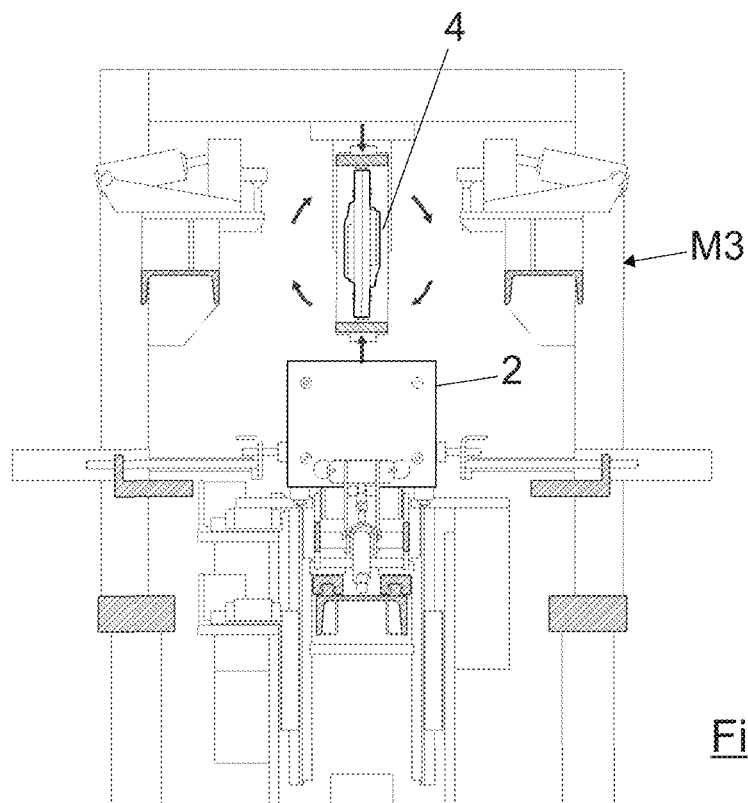
FIG. 32: Front view of the conditioning module turning over the lid.
Figure 33:
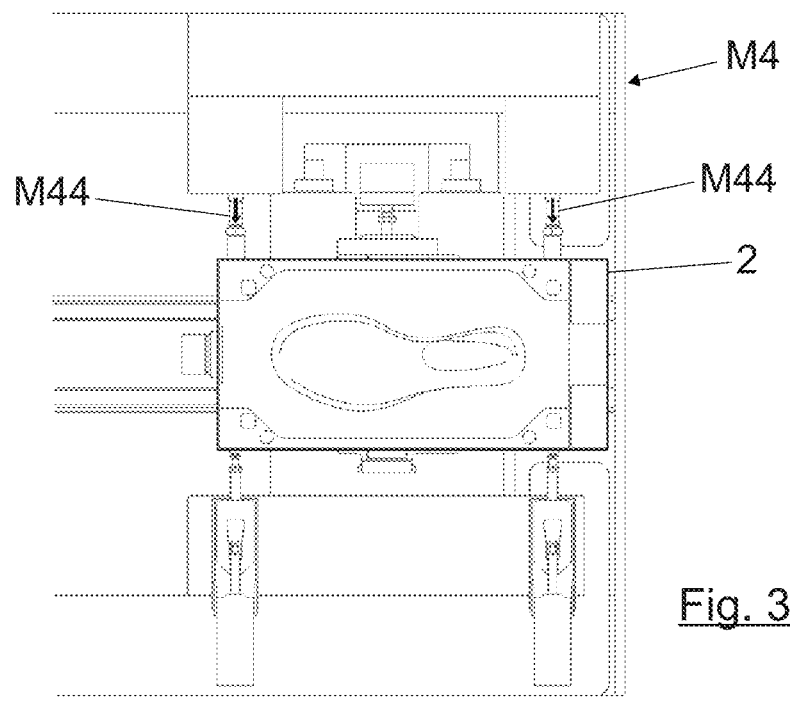
FIG. 33: Plan view of the handling module performing the lateral opening of the body.
Figure 34:
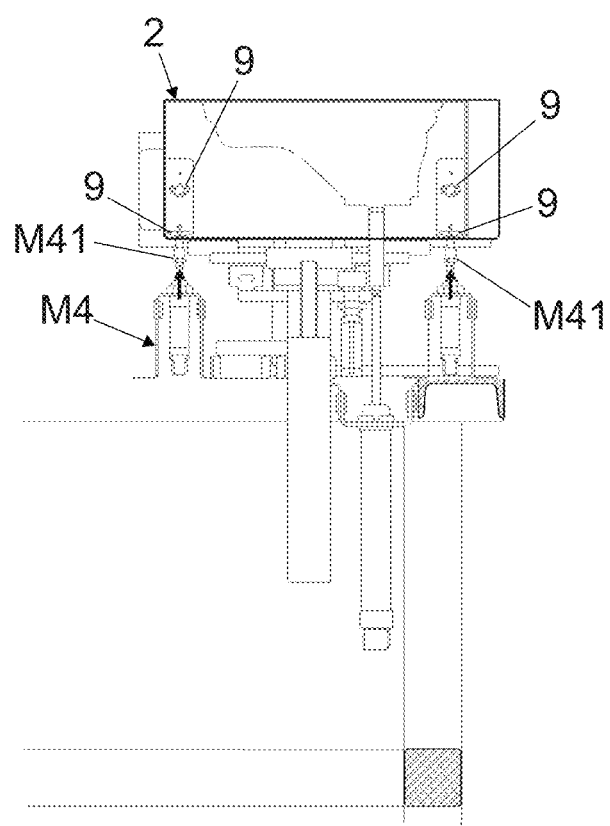
FIG. 34: Side view of the handling module performing the lateral opening of the body.
Figure 35:
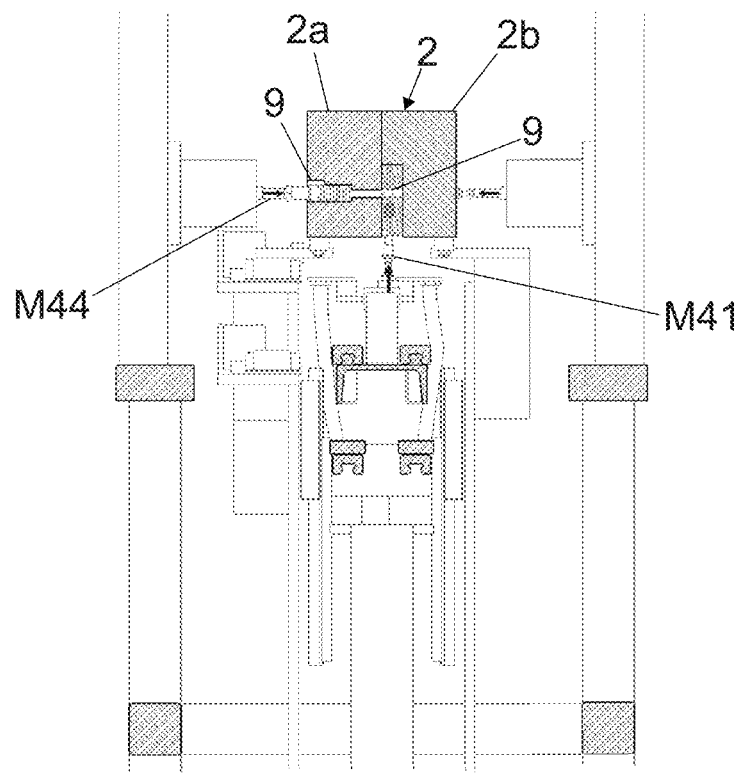
FIG. 35: Front view of the handling module with the body cross-sectioned, showing the first lateral part and the second lateral part joined together.
Figure 36:
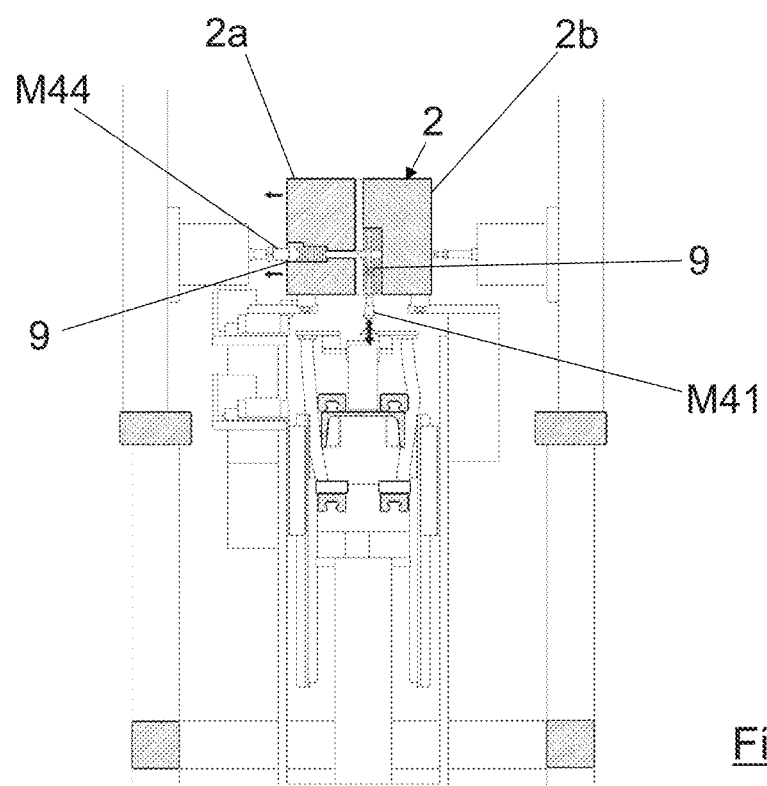
FIG. 36: Front view of the handling module with the body cross-sectioned, showing the first lateral part and the second lateral part separated.

FIGS. 31 and 32, respectively, show a side view and a front view of the conditioning module (M3) turning over the lid (4). As seen, the conditioning module (M3) comprises a turning mechanism (M36) configured to turn over the lid (4).

FIGS. 33-36 respectively show a plan view, a side view and two front views of the handling module (M4) performing the lateral opening of the body (2).

As seen, the handling module (M4) comprises:
  a lateral opening mechanism (M41) configured to act on lateral closing and opening means (9) of said body (2) in order to laterally separate a first lateral part (2a) and a second lateral part (2b) thereof; and
  a lateral closing mechanism (M44) configured to act on the lateral closing and opening means (9) of said body (2) in order to laterally join the first lateral part (2a) and the second lateral part (2b) thereof.

The described configuration of the lateral opening mechanism (M41) and the lateral closing mechanism (M44) enables the lower face of the mould (1) and the lateral faces thereof to be acted on, respectively. This enables space to be freed up in the central and upper portion of the handling module (M4), in order to facilitate the job of placing the components of the item to be manufactured for an operator or for the robotic mechanism (M43), see FIG. 20.

Thus, the machine (M1) operates on the mould (1) of the present invention, handling the self-locking mechanisms (5, 9) thereof. Specifically:
  the machine (M1) is configured to work with the mould (1) by acting on the incorporated closing and opening means (5) to separate the lid (4) from the body (2); and/or
  the machine (M1) is configured to work with the mould (1) by acting on the lateral closing and opening means (9) in order to keep the first lateral part (2a) and the second lateral part (2b) joined, and to enable a subsequent lateral separation thereof.

Figure 37:
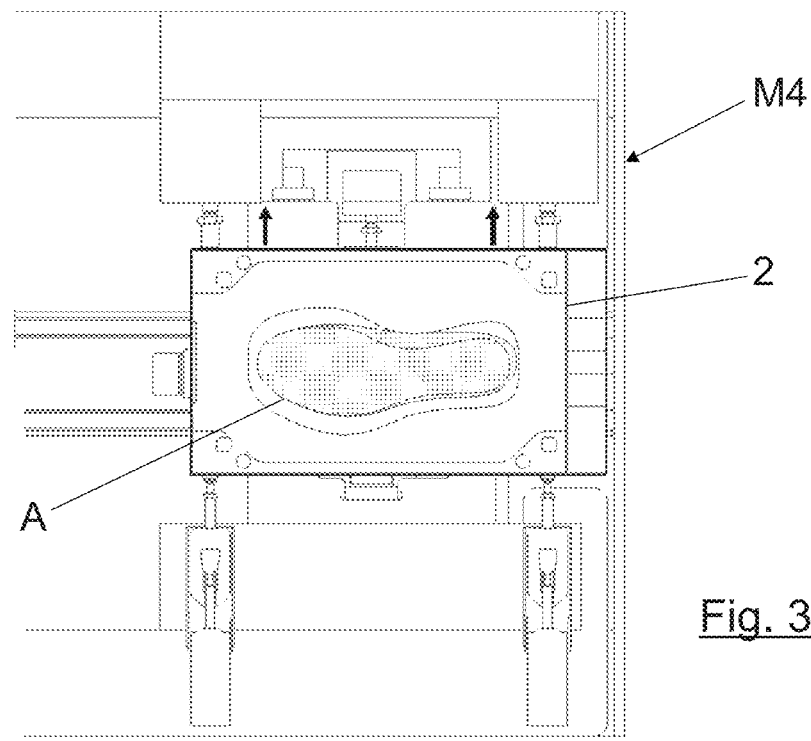
FIG. 37: Plan view of the handling module performing the demoulding.
Figure 38:
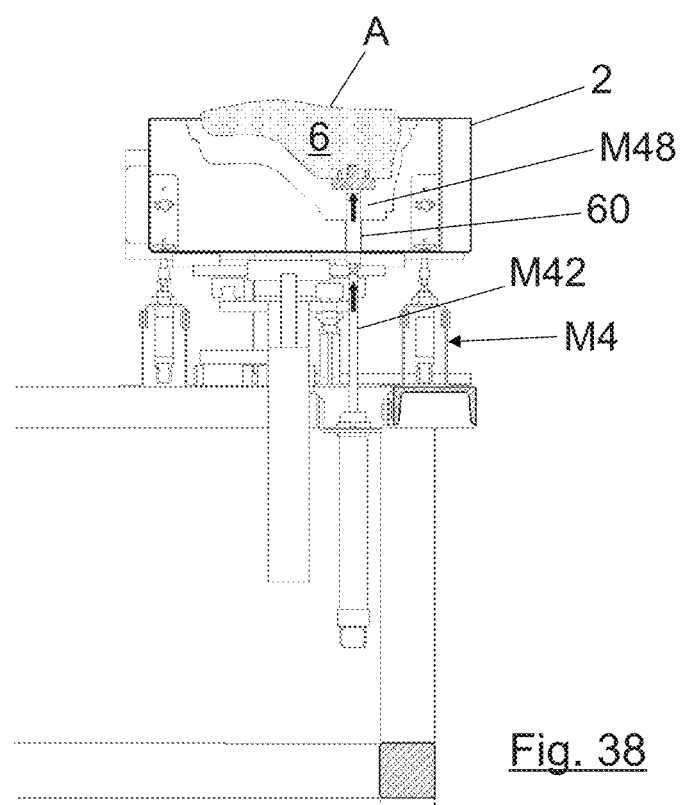
FIG. 38: Side view of the handling module performing the demoulding.

FIGS. 37 and 38, respectively, show a plan view and a side view of the handling module (M4) performing the demoulding.

As seen, the handling module (M4) comprises:
a demoulding mechanism (M42) configured to enable the extraction of a manufactured item (A) arranged inside the body (2).

The body (2) of the mould (1) comprises a demoulding hole (60) configured to enable the passage of a demoulding element (M48) of the machine (M1) for extracting the last (6) by pushing on it with said demoulding element (M48). In this manner, once the item (A) has been manufactured, the last (6) can be extracted from it.

The previous figures show the method for manufacturing three-dimensional items of the present invention, which comprises the following steps:
a) receiving a mould (1) formed by a body (2) and a lid (4) joined by means of incorporated closing and opening means (5);
b) acting on the incorporated closing and opening means (5) in order to separate the lid (4) from the body (2); and
c) placing the components of the item to be manufactured inside the body (2).

Step a) comprises:
a1) receiving the mould (1) on a first conveyor belt (M21); and
a2) aligning the mould (1) according to an advance direction ($d_{M21}$) of the first conveyor belt (M21).

Step b) comprises:
b1) receiving the mould (1) on a second conveyor belt (M31);
b2) centring the mould (1) horizontally, longitudinally and transversely according
to an advance direction ($d_{M31}$) of the second conveyor belt (M31);
b3) lifting the mould (1);
b4) acting on the incorporated closing and opening means (5) of the mould (1) in order to separate the lid (4) from the body (2); and
b5) securing the lid (4) once it is separated from the body (2).

Step b) additionally comprises:
b6) turning over the lid (4).

Step b) additionally comprises:
b7) acting on the incorporated closing and opening means (5) of the mould (1) in order to join the lid (4) to the body (2).

Step c) comprises:
c1) acting on lateral closing and opening means (9) of the body (2) in order to laterally separate a first lateral part (2a) and a second lateral part (2b) thereof.

Step c) additionally comprises:
c2) extracting a manufactured item (A) arranged within the body (2); and/or
c3) placing the components of the item to be manufactured inside the body (2).

Step c) additionally comprises:
c4) acting on the lateral closing and opening means (9) of the body (2) in order to laterally join the first lateral part (2a) and the second lateral part (2b) thereof.

The three-dimensional items (A) to be manufactured have flexible walls.

Figure 39:
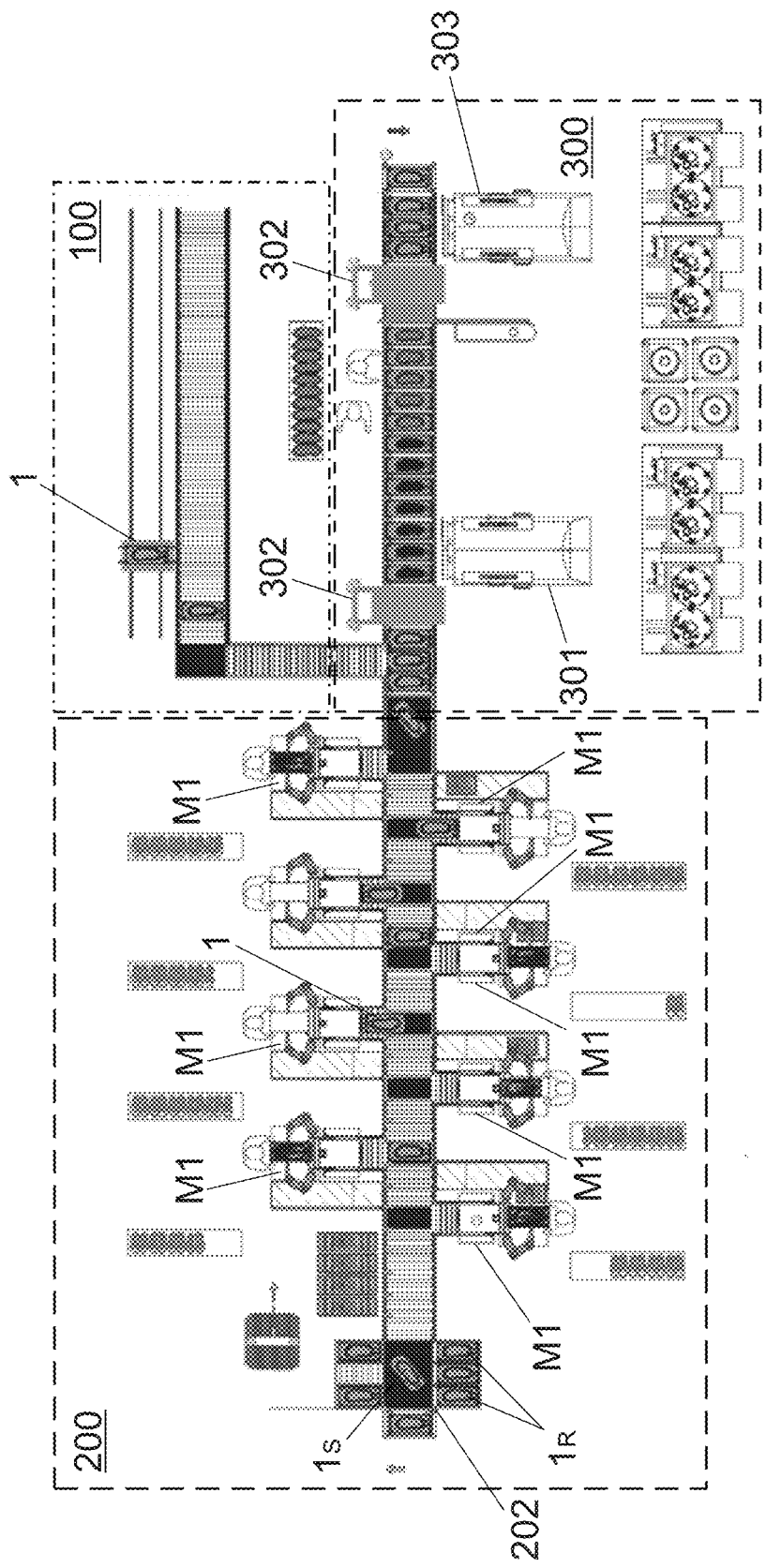
FIG. 39: Schematic view of the manufacturing plant of the present invention.

FIG. 39 shows a schematic view of the smart manufacturing plant for manufacturing three-dimensional items of the present invention.

As seen, this plant includes:
a selection area (100) configured to store a plurality of moulds (1) formed by a body (2) and a lid (4) joined by means of incorporated closing and opening means (5);

an assembly area (200) having a plurality of assembly machines (M1) configured to:
receive a mould (1) from the selection area (100);
act on the incorporated closing and opening means (5) in order to separate the lid (4) from the body (2);
enable the placement of the components of the item to be manufactured inside the body (2); and 2 act on the incorporated closing and opening means (5) in order to join the lid (4) to the body (2) after the placement of the components of the item to be manufactured; and an injection area (300) having a first injection machine (301) configured to:
receive a mould (1) from the assembly area (200) after the placement of the components of the item to be manufactured, the lid (4) of which is joined to the body (2); and
join the components of the item to be manufactured arranged inside the mould (1) by means of a first injection of plastic material.

The injection area (300) comprises:
two turning machines (302) configured to:
receive a mould (1) from the assembly area (200) after the placement of the components of the item to be manufactured, and to receive a mould (1) from the first injection machine (301) after the first injection of plastic material; and
turn over the lid (4) and join it to the body (2) once again;
and
a second injection machine (303) configured to:
receive the mould (1) from the turning machine (302); and
perform a second injection of plastic material.

The assembly area (200) comprises an advancement area (202) which enables the advancement of a selected mould (1s) over other waiting moulds (1R) in order to lead it to a free assembly machine (M1).

The manufacturing plant incorporates:
an electrical system which provides energy to the moulds (1) in a selective manner;
a remote mould control system (1); and
a smart storage which optimises the use of the moulds (1), since they can enter and exit when necessary due to the mobility thereof, and because the factory accumulates manufacturing data and implements calculation algorithms which enable making the most efficient decisions for the fabrication process.

The mould (1) comprises remote identification means configured to transmit information about it by means of radio frequency to a data network. In this manner, the central data system of the manufacturing plant can receive said information and send the corresponding orders to the mould for the operation thereof.

The invention claimed is:
1. A mould for manufacturing three-dimensional items, comprising:
a body which defines an internal surface, comprising:
a fixed portion whereon the mould is supported; and
an interchangeable portion which is configured to be removably mounted on the fixed portion;
a lid configured to close said body; and
incorporated closing and opening means configured to keep the body and the lid joined during movement of said mould; wherein the incorporated closing and opening means are configured to move together with the mould along a production line, ensuring a secure and airtight closure of said mould, able to resist working pressures produced therein, keeping the lid closed against the body, wherein the interchangeable portion is arranged within the fixed portion, defining the internal surface of the body; and wherein the mould comprises:
- an elastically deformable template arranged between the body and the lid, which fits on the internal surface and which is configured to receive one or more laminar parts of an item to be manufactured; and/or
- a countermould or last which occupies a defined volume between the body and the lid.

2. The mould according to claim 1, wherein the countermould or last is arranged between the template and the lid, and is configured to press the laminar parts against the template when the body and the lid are joined.

3. The mould according to claim 1, wherein the body comprises a demoulding hole configured to enable a passage of an external demoulding element for extracting the last by means of the pushing exerted thereon by said external demoulding element.

4. The mould according to claim 1, wherein the fixed portion is made of metal material; and the interchangeable portion is made of metal or plastic material.

5. The mould according to claim 1, wherein the body comprises:
- a vacuum chamber that communicates with a plurality of suction holes that reach the internal surface of the body; and
- an extraction nozzle which enables air to be extracted from the vacuum chamber; and the template comprises:
- a plurality of holes in communication with the suction holes, configured to attract one or more laminar parts of the item to be manufactured against said template when the air is extracted from the vacuum chamber.

6. The mould according to claim 1, wherein the body comprises:
- a first lateral part which defines a first portion of the internal surface; and
- a second lateral part which defines a second portion of the internal surface;

wherein the first lateral part and the second lateral part are joined together when the lid is joined to the body, and configured to move in opposite directions once the lid is removed from the body.

7. The mould according to claim 6, wherein the first lateral part and the second lateral part are jointly covered by an elastic cover configured to prevent an entry of external air when both lateral parts are separated.

8. The mould according to claim 6, comprising lateral closing and opening means configured to keep the first lateral part and the second lateral part joined, and to enable a subsequent lateral separation thereof, formed by:
- at least one lateral latch which runs through a lateral hole of the body, at one end of which it has a lateral closing element configured to join the first lateral part to the second lateral part; and
- at least one lower actuation which runs through a lower hole of the body, at the end of which it has a lateral opening element configured to unlock the closing element of the lateral latch.

9. The mould according to claim 8, wherein the lateral closing and opening means comprise:
- at least one lead screw which laterally crosses through both lateral parts and which is configured to be threaded thereto; wherein the separation and subsequent joining of the lateral parts is performed by means of screwing/unscrewing said lead screw.

10. The mould according to claim 1, wherein the lid comprises:
- a first face which defines a first countermould associated with a first volume of the item to be manufactured; and
- a second face which defines a second countermould associated with a second volume of the item to be manufactured;

wherein the lid is reversible which enables the body to be closed through the first face or the second face.

11. The mould according to claim 1, wherein the incorporated closing and opening means comprise:
- at least one upper latch which runs through an upper hole extending from the body to the lid, at an end of which it has an upper closing element configured to join the body to the lid; and
- at least one locking element which works in collaboration with the upper closing element; and
- at least one unlocking actuation configured to release the closing element from the locking element.

12. The mould according to claim 1, wherein the incorporated closing and opening means comprise at least one closing spring configured to press the lid against the body when both are joined;
and the incorporated closing and opening means comprise at least one rod which has:
- an upper end whereon an upper latch is arranged; and
- a lower end whereon the closing spring is arranged;
- wherein the closing spring is in a compressed position when the lid is joined to the body in order to exert a downward pushing force against the lower end of the rod.

13. The mould according to claim 1, comprising an injection mechanism configured to slide upwards by means of an action exerted by an elastic mechanism arranged between the body and the lid.

14. The mould according to claim 1, wherein the lid comprises a partial coating made of an elastically deformable material.

15. The mould according to claim 1, wherein it is configured to be kept closed without needing to be connected or fastened to a machine, enabling the mobility thereof along a process chain of a manufacturing plant.

16. The mould according to claim 1, wherein it is configured to move along a production line together with the incorporated closing and opening means, keeping the body and the lid joined during the movement of said mould.

17. The mould according to claim 1, comprising a support base arranged underneath the body; and the incorporated closing and opening means are configured to leave a clearance between the body and the support base in order to enable a relative vertical movement between both of them.

18. A machine for manufacturing three-dimensional items configured to work with the mould according to claim 1, wherein the machine comprises:
- a body which defines an internal surface;
- a lid configured to close said body; and
- incorporated closing and opening means configured to keep the body and the lid joined during the movement of the mould;

wherein it is configured to work with the mould by actuating on the incorporated closing and opening means in order to separate the lid from the body.

19. The machine according to claim 18, configured to work with a mould, the body of which further comprises:

a first lateral part which defines a first portion of the internal surface; and a second lateral part which defines a second portion of the internal surface;

wherein the first lateral part and the second lateral part are joined together when the lid is joined to the body, and configured to move in opposite directions once the lid is removed from the body;

wherein the mould further comprises lateral closing and opening means configured to keep the first lateral part and the second lateral part joined, and to enable a subsequent lateral separation thereof;

wherein it is configured to work with the mould by acting on the lateral closing and opening means in order to keep the first lateral part and the second lateral part joined, and to enable a subsequent lateral separation thereof.

20. A method for manufacturing three-dimensional items, comprising the following steps:

a) receiving a mould according to claim 1 formed by a body and a lid joined by means of incorporated closing and opening means;

b) acting on the incorporated closing and opening means in order to separate the lid from the body; and c) placing the components of the item to be manufactured inside the body;

step c) comprises:

c1) acting on lateral closing and opening means of the body in order to laterally separate a first lateral part and a second lateral part thereof.

21. A plant for manufacturing three-dimensional items, comprising:

a plurality of moulds according to claim 1 formed by a body and a lid joined by means of incorporated closing and opening means;

a selection area configured to store the plurality of moulds;

an assembly area which has at least one assembly machine configured to:

receive a mould from the selection area;

act on the incorporated closing and opening means in order to separate the lid from the body;

enable placement of the components of an item to be manufactured inside the body; and act on the incorporated closing and opening means in order to join the lid to the body after the placement of the components of the item to be manufactured;

and an injection area having at least a first injection machine configured to:

receive a mould from the assembly area after the placement of the components of the item to be manufactured, the lid of which is joined to the body; and join the components of the item to be manufactured arranged inside the mould by means of a first injection of plastic material.

* * * * *